(12) United States Patent
Damnjanovic et al.

(10) Patent No.: US 8,570,977 B2
(45) Date of Patent: Oct. 29, 2013

(54) METHOD AND APPARATUS FOR HANDOVER IN A WIRELESS COMMUNICATION SYSTEM

(75) Inventors: Aleksandar Damnjanovic, San Diego, CA (US); Jelena M. Damnjanovic, San Diego, CA (US); Peter Gaal, San Diego, CA (US); Juan Montojo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 583 days.

(21) Appl. No.: 12/402,249

(22) Filed: Mar. 11, 2009

(65) Prior Publication Data

US 2009/0238141 A1  Sep. 24, 2009

Related U.S. Application Data

(60) Provisional application No. 61/038,860, filed on Mar. 24, 2008.

(51) Int. Cl.
 *H04W 4/00* (2009.01)
 *H04W 80/04* (2009.01)
 *H04W 36/18* (2009.01)

(52) U.S. Cl.
 CPC .............. *H04W 80/04* (2013.01); *H04W 36/18* (2013.01)
 USPC .......................................... 370/331; 455/436

(58) Field of Classification Search
 USPC .......................................... 370/331; 455/436
 See application file for complete search history.

(56) References Cited

U.S. PATENT DOCUMENTS

| 2001/0046240 | A1 | 11/2001 | Longoni et al. |
| 2008/0170531 | A1* | 7/2008 | Petry et al. ..................... 370/312 |
| 2008/0233960 | A1* | 9/2008 | Kangude et al. .............. 455/436 |
| 2010/0022250 | A1* | 1/2010 | Petrovic et al. ............... 455/450 |
| 2010/0255844 | A1* | 10/2010 | Fischer et al. ................ 455/436 |

FOREIGN PATENT DOCUMENTS

| DE | 202006019286 U1 | 5/2007 |
| WO | WO0147289 A2 | 6/2001 |
| WO | WO0172081 | 9/2001 |

OTHER PUBLICATIONS

International Search Report & Written Opinion—PCT/US2009/038038, International Search Authority—European Patent Office—Aug. 5, 2009.

(Continued)

*Primary Examiner* — Pao Sinkantarakorn
*Assistant Examiner* — Richard K Chang
(74) *Attorney, Agent, or Firm* — Liem T. Do

(57) ABSTRACT

Systems and methodologies are described that facilitate system frame number (SFN) indication and identification during a random access procedure (e.g., associated with a handover). As described herein, a target cell can configure one or more Random Access Responses (RARs) designated for transmission to a terminal during the access phase of a handover to include the SFN of the target cell. Techniques are further described herein by which the target cell can include SFN information in a sub-header associated with a RAR, in the payload of a RAR, and/or in other appropriate manners. In addition, the target cell can configure one or more flags of the RAR to indicate the presence of SFN information. Upon receiving a RAR with embedded SFN information, a terminal can utilize the SFN for operations such as frequency hopping or uplink resource configuration as described herein.

39 Claims, 15 Drawing Sheets

(56) References Cited

OTHER PUBLICATIONS

"3GPP TS 36.321 V8.1.0 (Mar. 2008); 3rd Generation Partnership Project; Technical Specification Group Radio Access Network; Evolved Universal Terrestrial Radio Access (E-UTRA) Medium Access Control (MAC) protocol specification (Release 8)" 3rd Generation Partnership Project (3GPP); TS 36.321 V8.1.0 (Mar. 2008), pp. 22-27.

Alcatel-Lucent: "Backoff parameter in Msg2", 3GPP TSG RAN WG2 # 61, R2-080924, Feb. 11-15, 2008.

Taiwan Search Report—TW098109570—TIPO—Feb. 24, 2013.

\* cited by examiner

METHOD AND APPARATUS FOR HANDOVER IN A WIRELESS COMMUNICATION SYSTEM

CROSS-REFERENCE

This application claims the benefit of U.S. Provisional Application Ser. No. 61/038,860, filed Mar. 24, 2008, and entitled "A METHOD OF HANDOVER IN A WIRELESS COMMUNICATION," the entirety of which is incorporated herein by reference.

BACKGROUND

I. Field

The present disclosure relates generally to wireless communications, and more specifically to techniques for conducting a handover in a wireless communication system.

II. Background

Wireless communication systems are widely deployed to provide various communication services; for instance, voice, video, packet data, broadcast, and messaging services can be provided via such wireless communication systems. These systems can be multiple-access systems that are capable of supporting communication for multiple terminals by sharing available system resources. Examples of such multiple-access systems include Code Division Multiple Access (CDMA) systems, Time Division Multiple Access (TDMA) systems, Frequency Division Multiple Access (FDMA) systems, and Orthogonal Frequency Division Multiple Access (OFDMA) systems.

Generally, a wireless multiple-access communication system can simultaneously support communication for multiple wireless terminals. In such a system, each terminal can communicate with one or more base stations via transmissions on the forward and reverse links. The forward link (or downlink) refers to the communication link from the base stations to the terminals, and the reverse link (or uplink) refers to the communication link from the terminals to the base stations. This communication link can be established via a single-in-single-out (SISO), multiple-in-signal-out (MISO), or a multiple-in-multiple-out (MIMO) system.

A terminal operating in a wireless communication system can change from the coverage of a first (e.g., source) cell to the coverage of a second (e.g., target) cell using a handover operation. For example, a terminal can initiate communications to request, and subsequently establish, a connection with the target cell during a handover. Subsequently, in order to utilize uplink frequency hopping, properly schedule resources for transmission to the target cell, and/or for other uses, the terminal may require knowledge of various parameters of the target cell. These parameters can include, for example, the system frame number (SFN) of the target cell.

Conventionally, a terminal obtains the SFN of a target cell from a broadcast channel provided by the target cell. However, obtaining the SFN in this manner can cause an appreciable amount of delay, which can result in service interruption to the terminal. Accordingly, it would be desirable to implement techniques for conducting a handover in a wireless communication system that mitigate at least the above shortcomings.

SUMMARY

The following presents a simplified summary of various aspects of the claimed subject matter in order to provide a basic understanding of such aspects. This summary is not an extensive overview of all contemplated aspects, and is intended to neither identify key or critical elements nor delineate the scope of such aspects. Its sole purpose is to present some concepts of the disclosed aspects in a simplified form as a prelude to the more detailed description that is presented later.

According to an aspect, a method for conducting a random access procedure in a wireless communication system is described herein. The method can comprise identifying an access request associated with a random access procedure from at least one terminal; configuring one or more Random Access Responses (RARs) to include a system frame number (SFN); and transmitting the one or more configured RARs to the at least one terminal during an access phase of a handover associated with the random access procedure.

A second aspect described herein relates to a wireless communications apparatus. The wireless communications apparatus can comprise a memory that stores data relating to a user equipment (UE) with which a connection is to be established during a random access procedure and a SFN associated with the wireless communications apparatus; and a processor configured to incorporate the SFN into at least one RAR and to transmit the at least one RAR during an access phase of a handover associated with the random access procedure.

A third aspect relates to an apparatus that facilitates handover in a wireless communication system. The apparatus can comprise means for receiving a connection request from a terminal during an access phase of a handover; and means for submitting one or more responses to the terminal during the access phase of the handover that indicate a SFN associated with the apparatus.

A fourth aspect relates to a computer program product, which can comprise a computer-readable medium that comprises code for identifying a UE to be attached during a random access procedure; code for determining a SFN; code for configuring one or more RARs to include the SFN; and code for transmitting the one or more RARs to the UE during an access phase of a handover associated with the random access procedure.

A fifth aspect described herein relates to a method used in a wireless communication system. The method can comprise constructing an 8-bit medium access control (MAC) sub-header, the MAC sub-header comprising a 1-bit Extension (E) field, a 1-bit Type (T) field, a 1-bit SFN indicator (S) field, a 1-bit Reserved (R) field, and a 4-bit Backoff Indicator (BI) field; setting the T field to a value that indicates presence of the BI field in the MAC sub-header; setting the S field to a value that indicates presence of a SFN in the BI field in place of BI information; placing a first portion of the SFN in the BI field of the MAC sub-header; placing a second portion of the SFN in an octet immediately following the BI field of the MAC sub-header; and transmitting the MAC sub-header within at least one MAC Protocol Data Unit (PDU) to a terminal during an access phase of a handover.

According to another aspect, a method for accessing a target cell in connection with a random access procedure is described herein. The method can comprise submitting an access request to a target cell during an access phase of a handover associated with a random access procedure; receiving one or more responses to the access request from the target cell during the access phase of the handover associated with the random access procedure that indicate inclusion of a SFN for the target cell; and determining the SFN for the target cell by analyzing the one or more received responses.

Yet another aspect relates to a wireless communications apparatus, which can comprise a memory that stores data relating to one or more RARs received from an Evolved Node B (eNB) during an access phase of a handover. The wireless communications apparatus can further comprise a processor configured to identify at least one RAR received from the eNB that contains a SFN associated with the eNB and to determine the SFN associated with the eNB from the at least one identified RAR.

Still another aspect relates to an apparatus that facilitates handover in a wireless communication system. The apparatus can comprise means for receiving a RAR from a target base station during a random access procedure that indicates inclusion of a SFN for the target base station; and means for analyzing the received RAR to determine the SFN for the target base station.

An additional aspect described herein relates to a computer program product, which can comprise a computer-readable medium that comprises code for receiving one or more RARs from a target cell of a random access procedure during an access phase of a handover associated with the random access procedure; code for identifying a RAR from the target cell that indicates a SFN of the target cell; and code for determining the SFN of the target cell from the identified RAR.

A further aspect described herein relates to an integrated circuit that executes computer-executable instructions for identifying SFN information associated with a target cell during a random access procedure. The instructions can comprise transmitting an access request to a target cell during a random access procedure; receiving one or more responses to the access request from the target cell during the random access procedure; identifying an indication in at least one of the responses that a SFN for the target cell is included in an indicated response; and obtaining the SFN for the target cell from the indicated response.

To the accomplishment of the foregoing and related ends, one or more aspects of the claimed subject matter comprise the features hereinafter fully described and particularly pointed out in the claims. The following description and the annexed drawings set forth in detail certain illustrative aspects of the claimed subject matter. These aspects are indicative, however, of but a few of the various ways in which the principles of the claimed subject matter can be employed. Further, the disclosed aspects are intended to include all such aspects and their equivalents.

DETAILED DESCRIPTION

Figure 1:
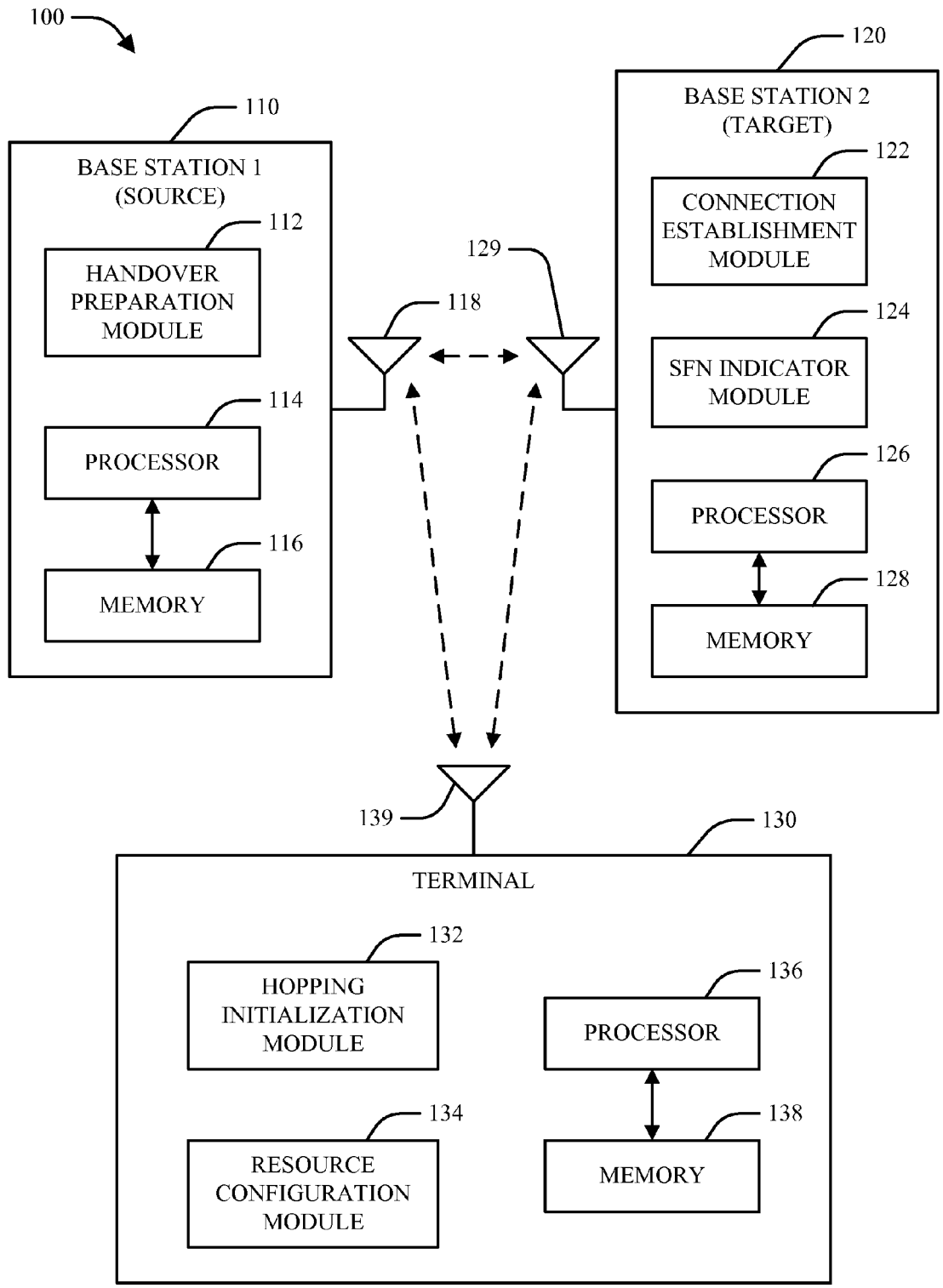
FIG. 1 is a block diagram of a system for conducting a handover in a wireless communication system in accordance with various aspects.

Various aspects of the claimed subject matter are now described with reference to the drawings, wherein like reference numerals are used to refer to like elements throughout. In the following description, for purposes of explanation, numerous specific details are set forth in order to provide a thorough understanding of one or more aspects. It may be evident, however, that such aspect(s) may be practiced without these specific details. In other instances, well-known structures and devices are shown in block diagram form in order to facilitate describing one or more aspects.

As used in this application, the terms "component," "module," "system," and the like are intended to refer to a computer-related entity, either hardware, firmware, a combination of hardware and software, software, or software in execution. For example, a component can be, but is not limited to being, a process running on a processor, an integrated circuit, an object, an executable, a thread of execution, a program, and/or a computer. By way of illustration, both an application running on a computing device and the computing device can be a component. One or more components can reside within a process and/or thread of execution and a component can be localized on one computer and/or distributed between two or more computers. In addition, these components can execute from various computer readable media having various data structures stored thereon. The components can communicate by way of local and/or remote processes such as in accordance with a signal having one or more data packets (e.g., data from one component interacting with another component in a local system, distributed system, and/or across a network such as the Internet with other systems by way of the signal).

Furthermore, various aspects are described herein in connection with a wireless terminal and/or a base station. A wireless terminal can refer to a device providing voice and/or data connectivity to a user. A wireless terminal can be connected to a computing device such as a laptop computer or desktop computer, or it can be a self contained device such as a personal digital assistant (PDA). A wireless terminal can also be called a system, a subscriber unit, a subscriber station, mobile station, mobile, remote station, access point, remote terminal, access terminal, user terminal, user agent, user device, or user equipment (UE). A wireless terminal can be a subscriber station, wireless device, cellular telephone, PCS telephone, cordless telephone, a Session Initiation Protocol (SIP) phone, a wireless local loop (WLL) station, a personal digital assistant (PDA), a handheld device having wireless connection capability, or other processing device connected to a wireless modem. A base station (e.g., access point or Evolved Node B (eNB)) can refer to a device in an access network that communicates over the air-interface, through one or more sectors, with wireless terminals. The base station can act as a router between the wireless terminal and the rest of the access network, which can include an Internet Protocol (IP) network, by converting received air-interface frames to IP packets. The base station also coordinates management of attributes for the air interface.

Moreover, various functions described herein can be implemented in hardware, software, firmware, or any combination thereof. If implemented in software, the functions can be stored on or transmitted over as one or more instructions or code on a computer-readable medium. Computer-readable media includes both computer storage media and communication media including any medium that facilitates transfer of a computer program from one place to another. A storage media can be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc (BD), where disks usually reproduce data magnetically and discs reproduce data optically with lasers. Combinations of the above should also be included within the scope of computer-readable media.

Various techniques described herein can be used for various wireless communication systems, such as Code Division Multiple Access (CDMA) systems, Time Division Multiple Access (TDMA) systems, Frequency Division Multiple Access (FDMA) systems, Orthogonal Frequency Division Multiple Access (OFDMA) systems, Single Carrier FDMA (SC-FDMA) systems, and other such systems. The terms "system" and "network" are often used herein interchangeably. A CDMA system can implement a radio technology such as Universal Terrestrial Radio Access (UTRA), CDMA2000, etc. UTRA includes Wideband-CDMA (W-CDMA) and other variants of CDMA. Additionally, CDMA2000 covers the IS-2000, IS-95 and IS-856 standards. A TDMA system can implement a radio technology such as Global System for Mobile Communications (GSM). An OFDMA system can implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDM®, etc. UTRA and E-UTRA are part of Universal Mobile Telecommunication System (UMTS). 3GPP Long Term Evolution (LTE) is an upcoming release that uses E-UTRA, which employs OFDMA on the downlink and SC-FDMA on the uplink. UTRA, E-UTRA, UMTS, LTE and GSM are described in documents from an organization named "3rd Generation Partnership Project" (3GPP). Further, CDMA2000 and UMB are described in documents from an organization named "3rd Generation Partnership Project 2" (3GPP2).

Various aspects will be presented in terms of systems that can include a number of devices, components, modules, and the like. It is to be understood and appreciated that the various systems can include additional devices, components, modules, etc. and/or can not include all of the devices, components, modules etc. discussed in connection with the figures. A combination of these approaches can also be used.

Referring now to the drawings, FIG. 1 illustrates a system 100 for conducting a handover in a wireless communication system in accordance with various aspects described herein. As FIG. 1 illustrates, system 100 can include one or more base stations 110 and/or 120, which can interact with each other and/or one or more terminals 130 via respective antennas 118, 129, and/or 139. For example, base stations 110 and/or 120 can engage in one or more downlink (DL, also referred to as forward link (FL)) communications with terminal 130, and terminal 130 can engage in one or more uplink (UL, also referred to as reverse link (RL)) communications with base stations 110 and/or 120.

In accordance with one aspect, terminal 130 can initially be attached to a first (or source) base station 110 in order to enable terminal 130 to communicate with source base station 110 for various applications such as, e.g., voice, data, video, and/or any other suitable application(s). In one example, terminal 130 and/or source base station 110 can enable communication coverage for terminal 130 to change from source base station 110 to target base station 120 during a handoff (or handover) procedure under various circumstances. For example, a handover can be initiated if terminal 130 is moving outside the coverage area of source base station 110, if terminal 130 requires functionality that base station 110 is not capable of providing, and/or for other appropriate reasons.

In one example, source base station 110 can include a handover preparation module, which can prepare terminal 130 and/or a target base station 120 for a handoff from source base station 110 to target base station 120. Handover preparation module 112 can, for example, forward data queued for transmission, timing information or other synchronization data, acknowledgement or re-transmission data, and/or any other information suitable for aiding a transition from source base station 110 to target base station 120. While handover preparation module 112 is illustrated at source base station 110, it should be appreciated that said module could also be associated with terminal 130, target base station 120, a standalone entity within system 100, and/or any other suitable device in system 100. Further, handover preparation module 112 can facilitate a smooth transition between coverage of source base station 110 and target base station 120 by, for example, facilitating closure of an existing connection between source base station 110 and terminal 130.

In accordance with one aspect, target base station 120 can include a connection establishment module 122, which can be utilized to initialize communication between target base station 120 and terminal 130 during and/or subsequent to a handover. While connection establishment module 122 is illustrated at base station 120, it should be appreciated that terminal 130 or any other suitable network entity can also include and/or implement some or all functionality of said module. In one example, connection establishment module 122 can facilitate the communication of control signaling and/or other information needed for terminal 130 to successfully connect to target base station 120. This information can include, for example, resource information, orthogonal sequences utilized by target base station 120 for, e.g., code division multiplexing (CDM), timing and/or synchronization information, or any other suitable information. Such information can be provided as one or more messages to terminal 130 during a handover, via a broadcast channel, and/or in any other suitable manner.

In accordance with another aspect, information received by terminal 130 from base station 120 can include the system frame number (SFN) of base station 120. In some network implementations, it can be appreciated that the SFN of base station 120 can be required by terminal 130 in order to optimally communicate with base station 120. For example, if base station 120 coordinates communication using a frequency hopping pattern, a hopping initialization module 132 at terminal 130 can facilitate proper use of the hopping pattern associated with base station 120 by terminal 130. However, if the hopping pattern used by base station 120 is configured to be variable (e.g., as a function of SFN), terminal 130 may be required to obtain the SFN of base station 120 before it can effectively communicate with base station 120. Moreover, even if a hopping pattern utilized by target base station 120 is configured to be fixed independently of SFN, terminal 130 can still in some circumstances be required to have knowledge of the SFN of base station 120 in order to communicate uplink control information using the hopping pattern. Such control information can, for example, be desirable or necessary for link adaptation, channel scheduling, and/or other functions of terminal 130.

In another example, terminal 130 can include a resource configuration module 134 to determine a set of resources in time, frequency, code, or the like, to be used by terminal 130 in communicating with base station 120. However, based on the configuration of base station 120, the resources associated with terminal 130 could vary as a function of the SFN of base station 120 and/or other information. Thus, for example, offsets could be applied to frequency subcarriers and/or other resource elements used by terminal 130 for communication that vary as a function of the SFN of base station 120. In this case, it can be appreciated that terminal 130 would require knowledge of the SFN of base station 120 in order to configure communications from terminal 130 to utilize only those resources with which terminal 130 has been associated. As another example, orthogonal sequences and/or channels used by terminal 130 can be assigned as a function of the SFN of base station 120 such that terminal 130 requires knowledge of the SFN to compute one or more slots that have been allocated to terminal 130 for uplink communication.

Traditionally, terminal 130 is required to obtain the SFN of target base station 120 by reading the system information of target base station 120 during or after a handover to target base station 120. In one example, terminal 130 can accomplish this by monitoring a broadcast channel from base station 120. However, as broadcast channel communications are configured to be destination-agnostic and to repeat over time, there can be an associated delay in obtaining information from a broadcast channel of target base station 120 in this manner. Further, as noted above, in some circumstances terminal 130 can require the SFN of base station 120 following a handover before uplink transmission of data can be performed. As a result, requiring the SFN to be obtained from a broadcast channel from target base station 120 can result in delays attributable to an inability to transmit data after a handover to base station 120 until the SFN is obtained.

As an alternative to the broadcast channel implementation, terminal 130 can be provided with other means by which the SFN of target base station 120 can be read by terminal 130. However, it has traditionally been prohibitively difficult to supply a terminal with means to read information from a target cell before attachment to said target cell, and indeed there are no existing methods by which a terminal 130 can read the SFN of target base station 120 from target base station 120 before attachment. Accordingly, this technique must also occur after handover and would therefore incur substantially the same delays and interruptions in service as the broadcast channel implementation.

Accordingly, to mitigate the above shortcomings of existing wireless communication system implementations, base station 120 can include a SFN indicator module 124 to provide the SFN of base station 120 to terminal 130 during a random access procedure associated with a handover between base station 120 and terminal 130. In one example, by providing the SFN to terminal 130 during a random access procedure associated with a handover, it can be appreciated that terminal 130 can be provided SFN information as soon as a connection to base station 120 is requested, thereby mitigating delays associated with discovering the SFN of target base station 120 using traditional techniques.

In accordance with one aspect, a SFN can be provided by target base station 120 via SFN indicator module 124 in a variety of manners. For example, the SFN of base station 120 can be included in a header of a packet communicated to terminal 130 during a random access procedure (e.g., in one or more sub-headers). Additionally or alternatively, the SFN can form part of and/or be appended to the payload of one or more packets communicated during a random access procedure and/or in any other suitable manner. Specific examples of techniques for embedding SFN information into messaging associated with a random access procedure are described in further detail infra.

In accordance with another aspect, base stations 110 and/or 120 can include respective processors 114 and/or 126, as well as respective memories 116 and/or 128, which can be utilized to implement and/or otherwise facilitate some or all of the functionality of the respective base stations 110 and/or 120 and their respective modules as described above. Similarly, terminal 130 can include a processor 136 and/or memory 138 for facilitating and/or implementing some or all functionality of hopping initialization module 132, resource configuration module 134, and/or any other component(s) of terminal 130 as generally described above.

Figure 2:
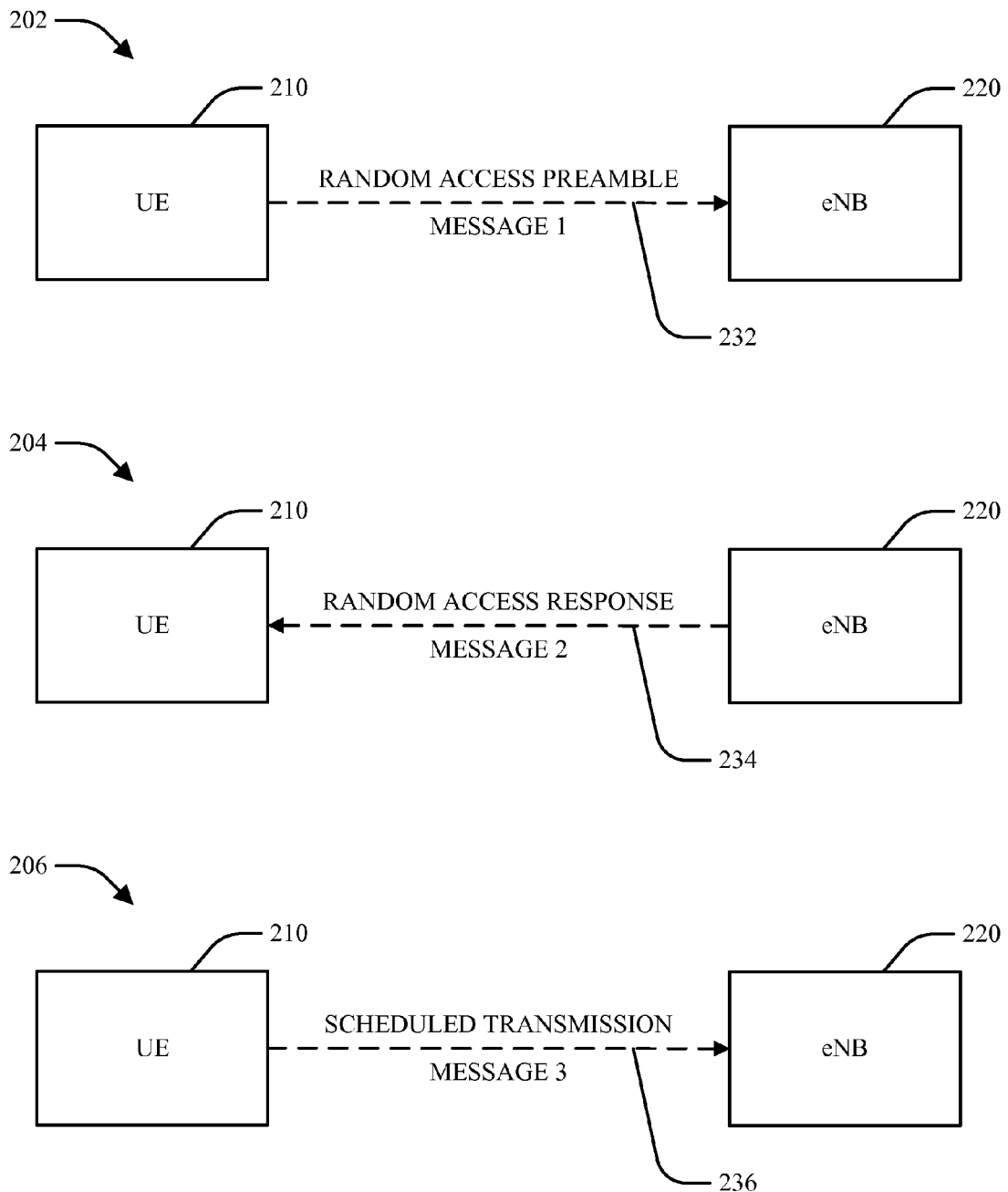
FIG. 2 illustrates an example random access procedure in a wireless communication system in accordance with various aspects.

Referring next to FIG. 2, a series of diagrams 202-206 are provided that illustrate an example random access procedure that can be implemented in a wireless communication system in accordance with various aspects. The procedure illustrated by diagrams 202-206 can be used, for example, during an access phase of a handover. In one example, the procedure illustrated by diagrams 202-206 can be utilized in a wireless communication system, such as a 3GPP LTE communication system, that includes one or more UEs 210 and one or more eNBs 220. In another example, a Random Access (RA) Channel (RACH) and/or another suitable uplink transport channel can be used to transfer control information from UE 210 to eNB 220 for, e.g., initial access for connection setup, location area updates, or the like. Additionally and/or alternatively, RACH can be used for transport of small and infrequent user data packets. In accordance with one aspect, RACH can function as a contention-based channel, wherein collisions can occur due to several UEs 210 simultaneously accessing RACH, as a result of which an initial access message cannot be decoded by eNB 220.

In accordance with one aspect, UE 210 can initialize the process illustrated by FIG. 2 as shown by diagram 202, wherein UE 210 sends a first physical message 232 (e.g., Message 1) to eNB 220 using a Physical RACH (PRACH). In one example, Message 1 232 can be an initial access request message that can contain a Random Access Preamble. A Random Access Preamble can include, for example, a 5-bit random ID and a 1-bit indicator for the size of a subsequent message (e.g., Message 3 236) based on radio conditions. Example packet structures that can be utilized for a Random Access Preamble are described in further detail infra. In one example, if the system illustrated by diagrams 202-206 utilizes non-contention based access, UE 210 can refrain from conveying information during Message 1 232.

Subsequently, as illustrated by diagram 204, eNB 220 can respond with its own message 234 (e.g., Message 2). In one example, Message 2 234 can echo a signature sequence provided by UE 210 in Message 1 220. In accordance with one aspect, Message 2 234 can comprise a Medium Access Control (MAC) Protocol Data Unit (PDU) message, which can include a Random Access Response (RAR). Further, Message 2 234 can be semi-synchronous with Message 1 232 within a flexible window of one or more transmission time intervals (TTIs) such that, for example, the procedure illustrated by diagrams 202-206 is restarted if a RAR is not received within the window. Further, Message 2 234 can be configured to have no Hybrid Automatic Repeat Request (HARQ), can be addressed to a Random Access Radio Network Temporary Identifier (RA-RNTI) on a Layer 1/Layer 2 (L1/L2) control channel, and can convey a RA-preamble identifier, timing alignment information, an initial UL grant, an assignment of a temporary Cell Radio Network Temporary Identifier (C-RNTI), and/or any other suitable information. In one example, a temporary C-RNTI can be discarded and/or made permanent upon Radio Resource Control (RRC) Contention Resolution.

In another example, Message 2 234 can additionally include overload information. For example, it can be appreciated that as some access causes can be subject to overload control, UE 210 can receive Message 2 234 for a preceding RACH occasion before determining whether to transmit. In one example, an overload control parameter can indicate a maximum time value against which UE 210 can perform uniform draw. In another example, if UE 210 does not detect Message 2 234, UE 210 can assume that no overload control applies to the next RACH occasion. In accordance with one aspect, a Message 2 234 can be provided for one or multiple UEs 210 in a single DL Shared Channel (DL-SCH) message. Examples of MAC PDU formats that can be utilized for Message 2 234, as well as example formats that can be utilized for overload information and/or an RAR, are provided in further detail infra.

In accordance with another aspect, Message 2 234 can contain an uplink grant, transport format, timing advance, and/or other information that can enable UE 210 to transmit a Message 3 236 as illustrated by diagram 206. In one example, Message 3 236 can contain a connection request message that includes a reason for the request. Message 3 236 can, in accordance with one aspect, be transported on an Uplink Shared Channel (UL-SCH) transport channel.

In accordance with another aspect, to perform initial access over an air (e.g., wireless) interface, the procedure illustrated by diagrams 202-206 can be implemented as a physical random access procedure. In one example, the procedure can utilize the RACH and two physical channels, e.g., PRACH and an Acquisition Indication Channel (AICH). The RACH can be mapped to the uplink physical channel (e.g., PRACH), while the AICH can be implemented as a downlink common channel that exists as a pair with the PRACH used for random access control.

In accordance with a further aspect, Message 1 232 communicated by UE 210 can act as an access probe to eNB 220 over RACH and/or another suitable communication channel. In one example, Message 1 232 can be communicated by UE 210 without knowledge of a SFN associated with eNB 220. However, as described above with relation to FIG. 1, UE 210 may require knowledge of the SFN associated with eNB 220 for subsequent procedures. Accordingly, to facilitate provision of the SFN of eNB 220 to UE 210 at the earliest possible time and to mitigate the effect of delays and/or service interruptions associated with reading the SFN of eNB 220, UE 210 can be enabled in accordance with various aspects herein to obtain the SFN of eNB 220 from Message 2 234. Message 2 234 can be formatted by eNB to include a SFN in various manners, examples of which are described in further detail herein.

Figure 3:
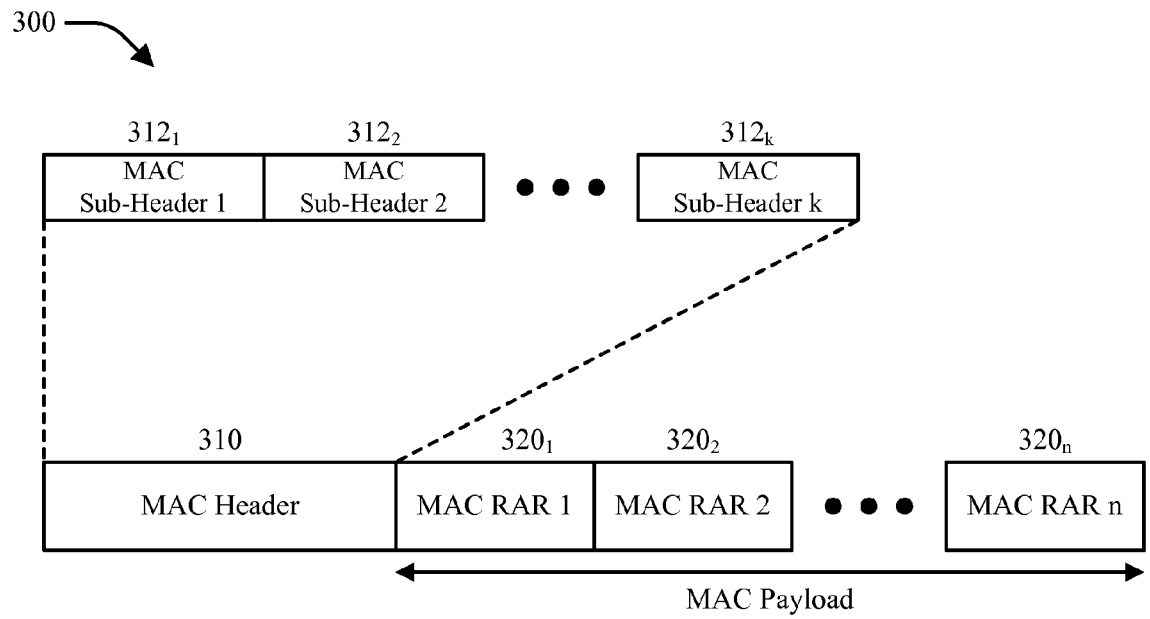
FIGS. 3-5 illustrate example message structures that can be utilized during a random access procedure in accordance with various aspects.

Turning to FIG. 3, a diagram 300 illustrating an example MAC PDU message structure that can be utilized during a random access procedure in accordance with various aspects is provided. As diagram 300 illustrates, a MAC PDU can include a MAC header 310, which can be followed by a payload of one or more MAC RARs 320. As diagram 300 further illustrates, MAC header 310 can be further divided into respective MAC sub-headers 312.

Figure 4:
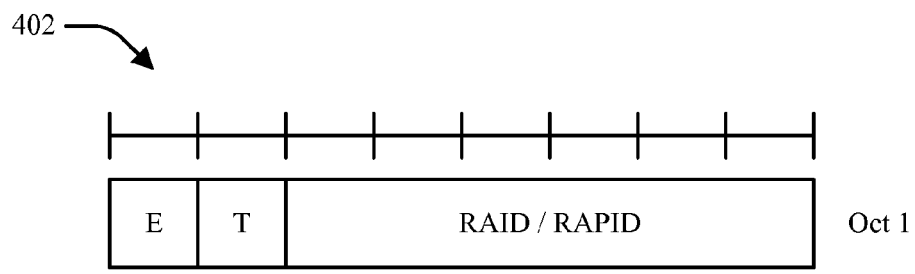
Figure 4:
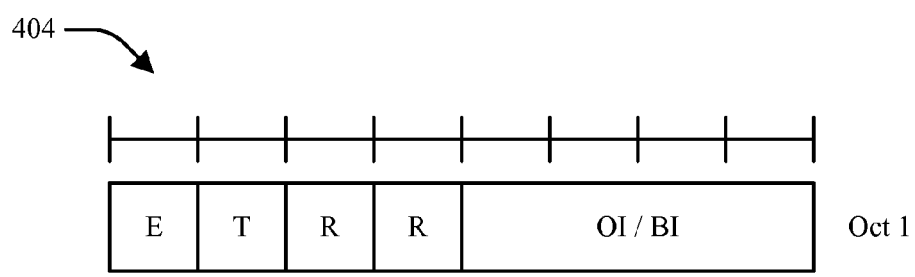

Examples of structures that can be utilized for MAC sub-headers 312 are illustrated by diagrams 402 and 404 in FIG. 4. In accordance with one aspect, a MAC sub-header can be formatted as one or more disparate types, examples of which are respectively illustrated by diagrams 402 and 404. For example, the MAC sub-header formats illustrated by both diagram 402 and diagram 404 can begin with a 1-bit Extension (E) field that indicates whether further sub-headers follow the present sub-header in the associated MAC header. For example, the E field can be set to '1' to indicate additional sub-headers and '0' to indicate no additional headers, or vice versa. Following the E field, the sub-header formats illustrated by diagrams 402 and 404 can include a 1-bit Type (T) field that indicates, for example, whether Random Access Preamble Identifier (RAID or RAPID) information (e.g., as shown in diagram 402) or Overload Indicator (OI) or Backoff Indicator (BI) information (e.g., as shown in diagram 404) follows the T field.

If the T field indicates the presence of RAPID information, the associated sub-header can be structured as shown in diagram 402, wherein a 6-bit RAPID field follows the T field. In one example, the RAPID field can identify a Random Access Preamble to which the message associated with the sub-header is being provided (e.g., a Message 1 232). Alternatively, if the T field indicates the presence of OI or BI information, the associated sub-header can be structured as shown in diagram 404, wherein two reserved (R) bits and a 4-bit OI and/or BI field follow the T field. In one example, an OI and/or BI field can be utilized to identify overload conditions of a cell transmitting the sub-header, which can be used to facilitate overload control as generally described above with regard to FIG. 2.

Figure 5:
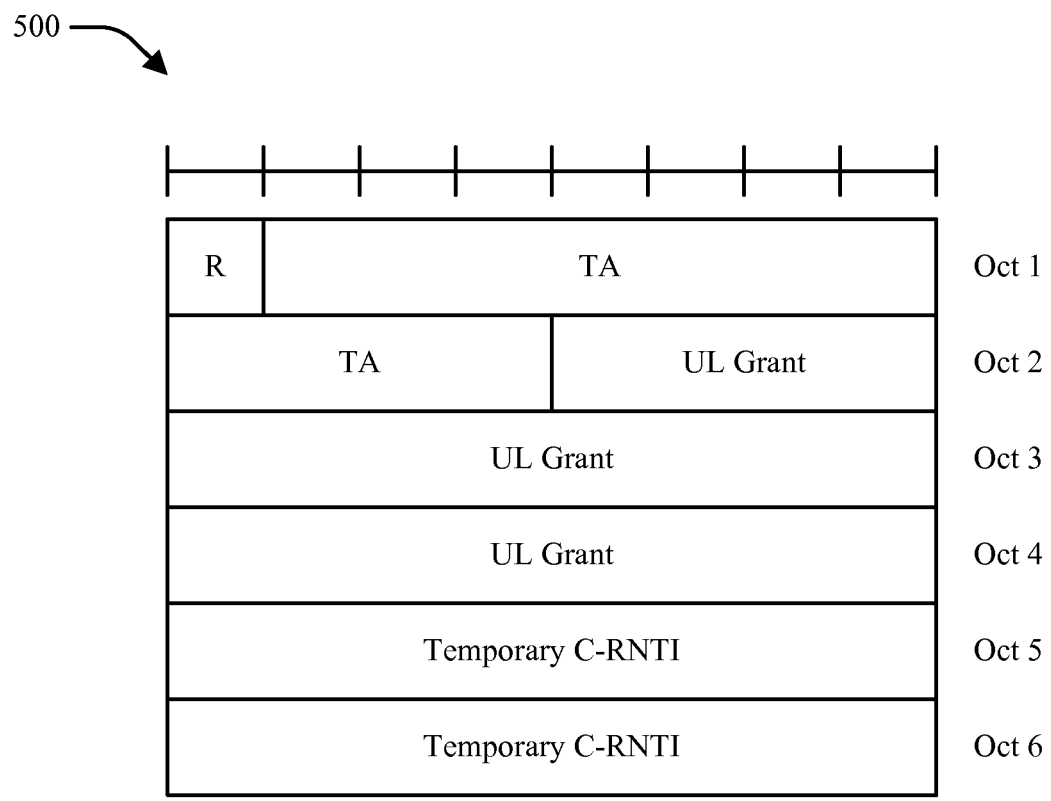

Referring to FIG. 5, a diagram 500 is provided that illustrates an example structure that can be utilized for MAC RARs in a MAC PDU message (e.g., MAC RARs 320 in the message illustrated by diagram 300). In one example, a MAC RAR can be constructed as a block of information formatted over a set of octets. As diagram 500 illustrates, a MAC RAR can be constructed with a leading Reserved (R) bit, which can be followed by a Timing Advance (TA) command. In one example, a TA command can be used to indicate an index value (e.g., $T_A \in \{0, 1, \ldots, 1282\}$), which can be used to control an amount of timing adjustment applied by a UE. As diagram 500 further illustrates, the TA command can be followed by a UL grant, which can indicate the resources to be used by a UE on the uplink, and a temporary C-RNTI that indicates a temporary identity to be used by the UE during Random Access.

Figure 6:
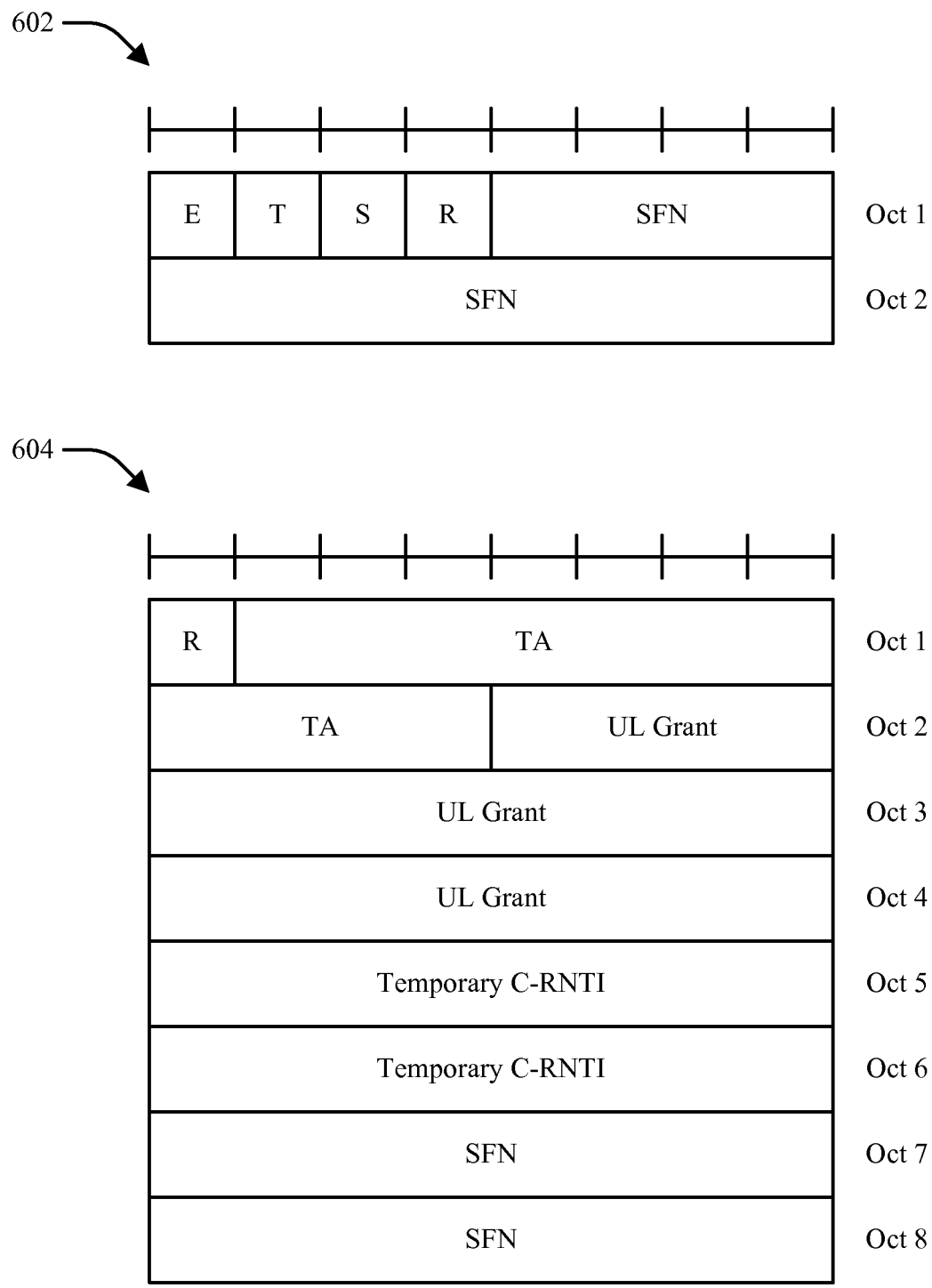
FIG. 6 illustrates example message structures that can be utilized to indicate a system frame number during a random access procedure in accordance with various aspects.

Turning to FIG. 6, respective diagrams 602 and 604 are provided that illustrate example message structures that can be utilized to indicate a SFN during a random access procedure in accordance with various aspects. It should be appreciated, however, that the example message structures shown in diagrams 602 and 604 are merely examples of message structures that could be utilized in accordance with the aspects described herein and that, unless explicitly stated otherwise, the claims are not intended to be limited to such examples.

In accordance with one aspect, a SFN associated with a eNB can be inserted into a MAC sub-header as illustrated by diagram 602. As diagram 602 illustrates, a first octet of a sub-header can be constructed in a similar manner to the E/T/R/R/OI format illustrated by diagram 404 in FIG. 4. To incorporate a SFN, one or more of the Reserved bits of the sub-header can be modified to carry a SFN indicator (S) field which, when set, can indicate to a UE that a SFN occupies the end of the first octet of the sub-header (e.g., instead of an OI/BI). In one example, the S field can also indicate that the SFN continues into a second octet. By utilizing reserved bits associated with an existing sub-header format in this manner, it can be appreciated that UEs with the capability to read a SFN from a sub-header can leverage the message structure illustrated by diagram 602 to obtain the SFN, while UEs without such capability can merely ignore the SFN indication.

In accordance with another aspect, a SFN for an eNB can be appended onto a MAC RAR as illustrated by diagram 604. However, while diagram 604 illustrates a SFN occupying the last two octets of a RAR, it should be appreciated that the SFN could occupy any suitable position within a RAR. In one example, the inclusion of SFN information into a MAC RAR can be indicated in a variety of manners. For example, a reserved bit at the beginning of the RAR can be set to a predetermined value to indicate the presence of the SFN. Additionally or alternatively, one or more bits in a sub-header corresponding to a PDU containing the RAR (e.g., as illustrated by diagram 300 in FIG. 3) can be set to indicate the presence of the SFN in the RAR. In a similar manner to the structure illustrated by diagram 602, it can be appreciated that setting one or more indicators in this manner can allow a UE with SFN-reading capability to obtain the SFN from the RAR, while UEs without such capability can merely ignore the SFN.

Referring now to FIGS. 7-11, methodologies that can be performed in accordance with various aspects set forth herein are illustrated. While, for purposes of simplicity of explanation, the methodologies are shown and described as a series of acts, it is to be understood and appreciated that the methodologies are not limited by the order of acts, as some acts can, in accordance with one or more aspects, occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with one or more aspects.

Figure 7:
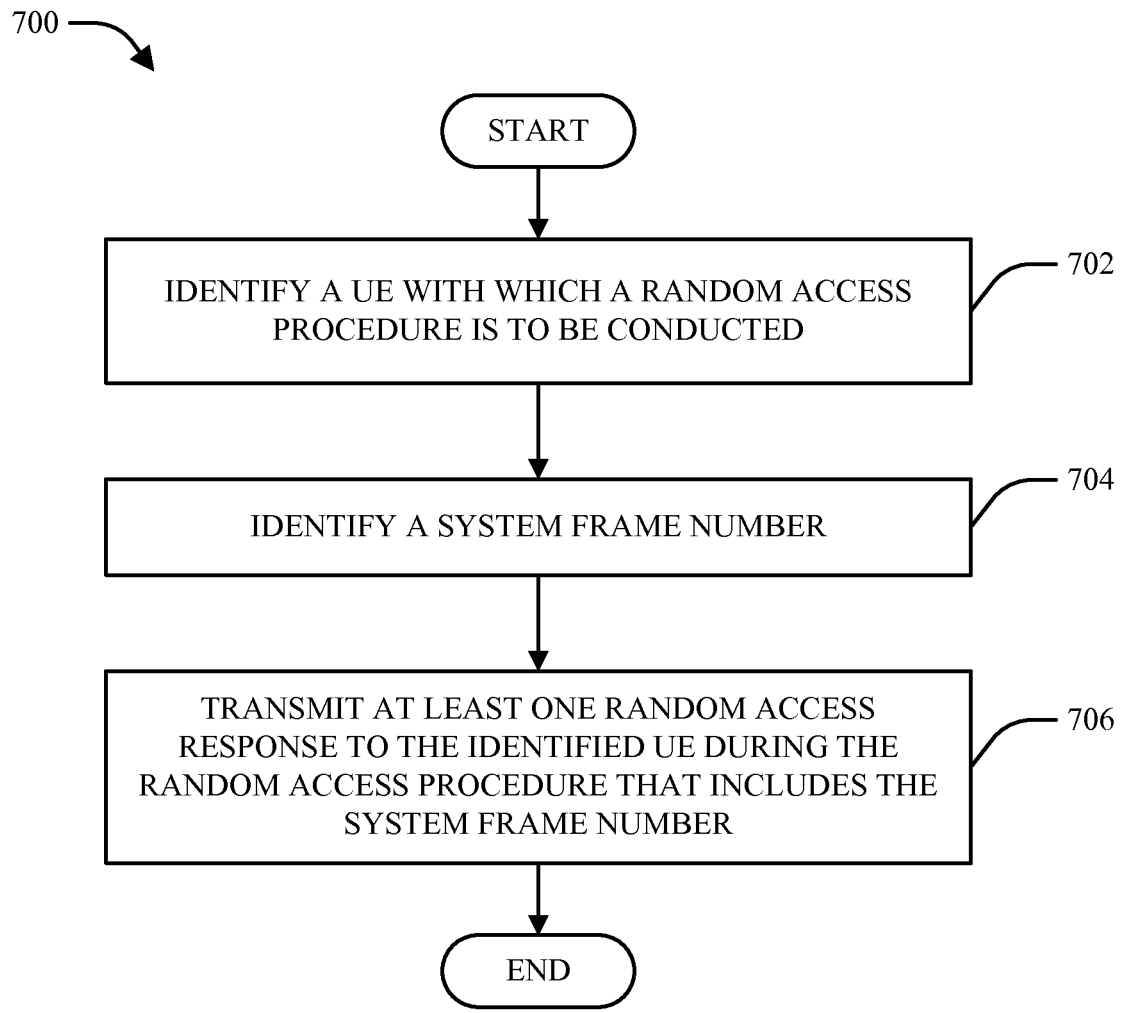
FIGS. 7-9 are flow diagrams of respective methodologies for providing a system frame number during a random access procedure.

With reference to FIG. 7, illustrated is a methodology 700 for providing a system frame number during a random access procedure (e.g., associated with a handover). It is to be appreciated that methodology 700 can be performed by, for example, a base station (e.g., base station 110 and/or 120) and/or any other appropriate network device. Methodology 700 begins at block 702, wherein a UE (e.g., terminal 130) with which a random access procedure is to be conducted is identified. Next, at block 704, a SFN is identified. Finally, at block 706, at least one Random Access Response is transmitted to the UE identified at block 702 (e.g., via a Message 2 234) that includes the SFN identified at block 704.

Figure 8:
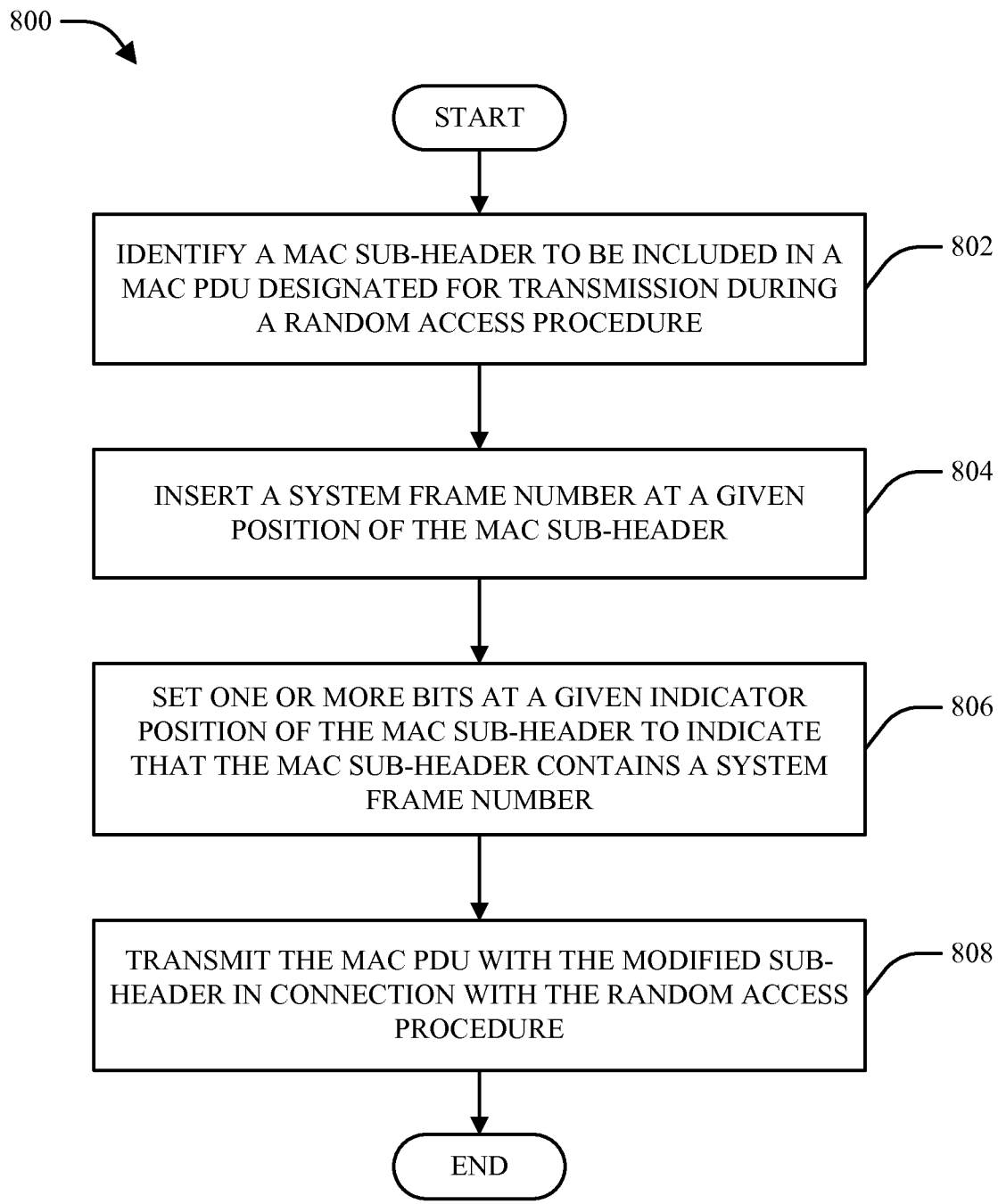

Turning to FIG. 8, a methodology 800 is illustrated for providing a system frame number in a message sub-header during a random access procedure. Methodology 800 can be performed by, for example, an eNB and/or any other suitable network entity. Methodology 800 begins at block 802, wherein a MAC sub-header to be included in a MAC PDU designated for transmission during a random access procedure (e.g., a sub-header 312 in a PDU as illustrated by diagram 300) is identified. Next, at block 804, a SFN is inserted at a given position of the MAC sub-header. Thus, in the example of an E/T/R/R/BI MAC sub-header as illustrated by diagram 404, a SFN can be inserted into a field reserved for OI and/or BI information, as well as into one or more octets following the field (e.g., as illustrated by diagram 602).

Upon completing the acts described at block 804, methodology 800 can proceed to block 806, wherein one or more bits at a given indicator position of the MAC sub-header are set to indicate that the MAC sub-header contains a SFN. By way of specific, non-limiting example, this can be accomplished as illustrated in diagram 602 by utilizing a first reserved bit following E and T fields of an E/T/R/R/BI MAC sub-header as a SFN indicator field to indicate the presence of a SFN in the sub-header. Methodology 800 can then conclude at block 808, wherein the MAC PDU designated for transmission at block 802 is transmitted in connection with the random access procedure with the sub-header modified according to blocks 804 and 806.

Figure 9:
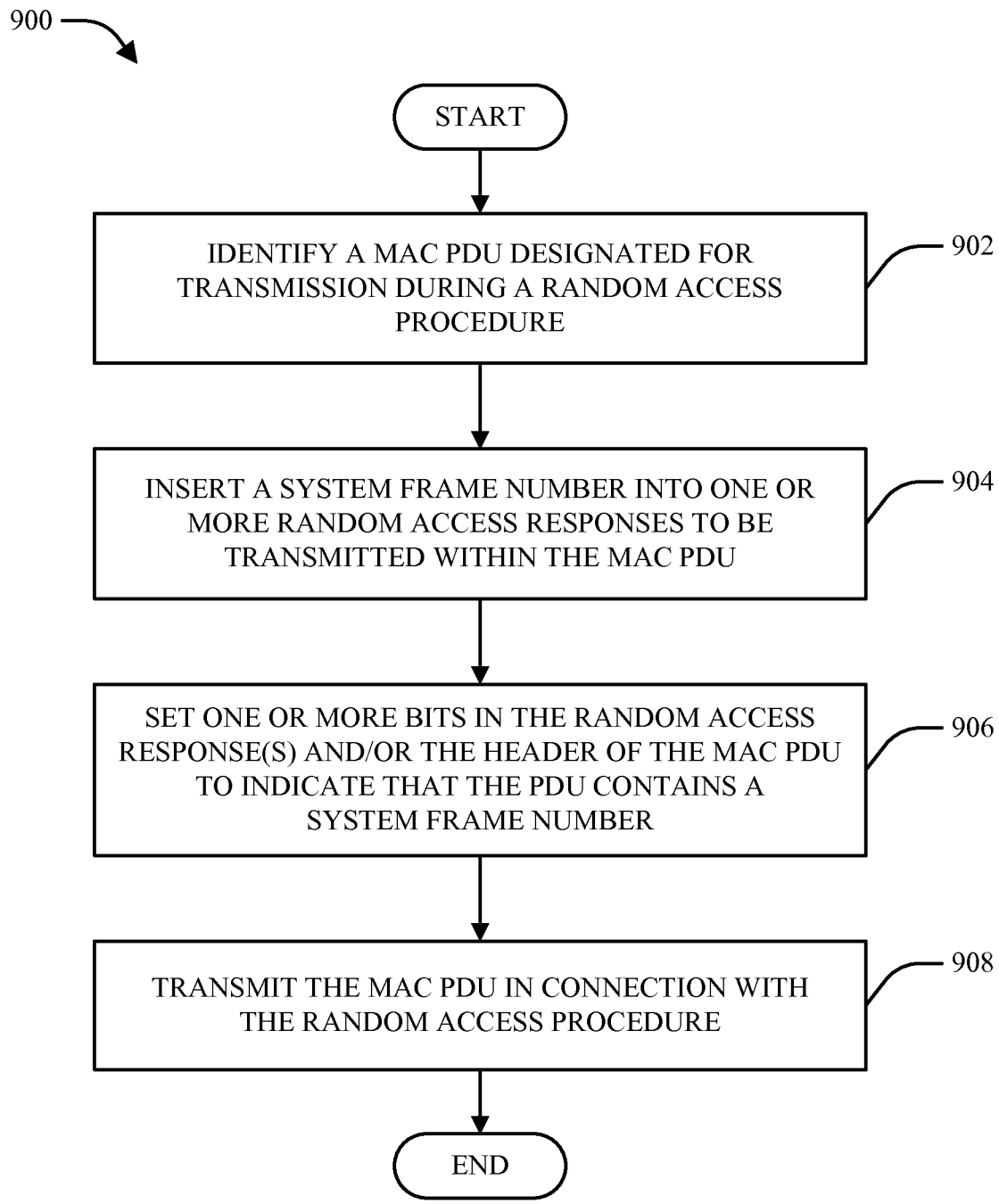

FIG. 9 illustrates a methodology 900 for providing a system frame number in a Random Access Response transmitted during a random access procedure. Methodology 900 can be performed by, for example, an eNB and/or any other suitable network device. Methodology 900 begins at block 902, wherein a MAC PDU designated for transmission during a random access procedure is identified. Next, at block 904, a SFN is inserted into one or more RARs to be transmitted within the MAC PDU identified at block 902. For example, a SFN can be appended to the end of a RAR as illustrated by diagram 604 and/or placed in any other suitable position within one or more RARs.

Upon completing the acts described at block 904, methodology 900 can proceed to block 906, wherein one or more bits in the RAR(s) modified at block 904 and/or the header of the MAC PDU identified at block 902 are set to indicate that the PDU contains a SFN. In accordance with various aspects, the one or more bits that are set at block 906 can include, for example, reserved bit(s) in a RAR modified at block 904 and/or one or more other RARs in the PDU, one or more bits in a header of the PDU, and/or any other suitable bit(s). Methodology 900 can then conclude at block 908, wherein the MAC PDU is transmitted in connection with the random access procedure (e.g., as a Message 2 234).

Figure 10:
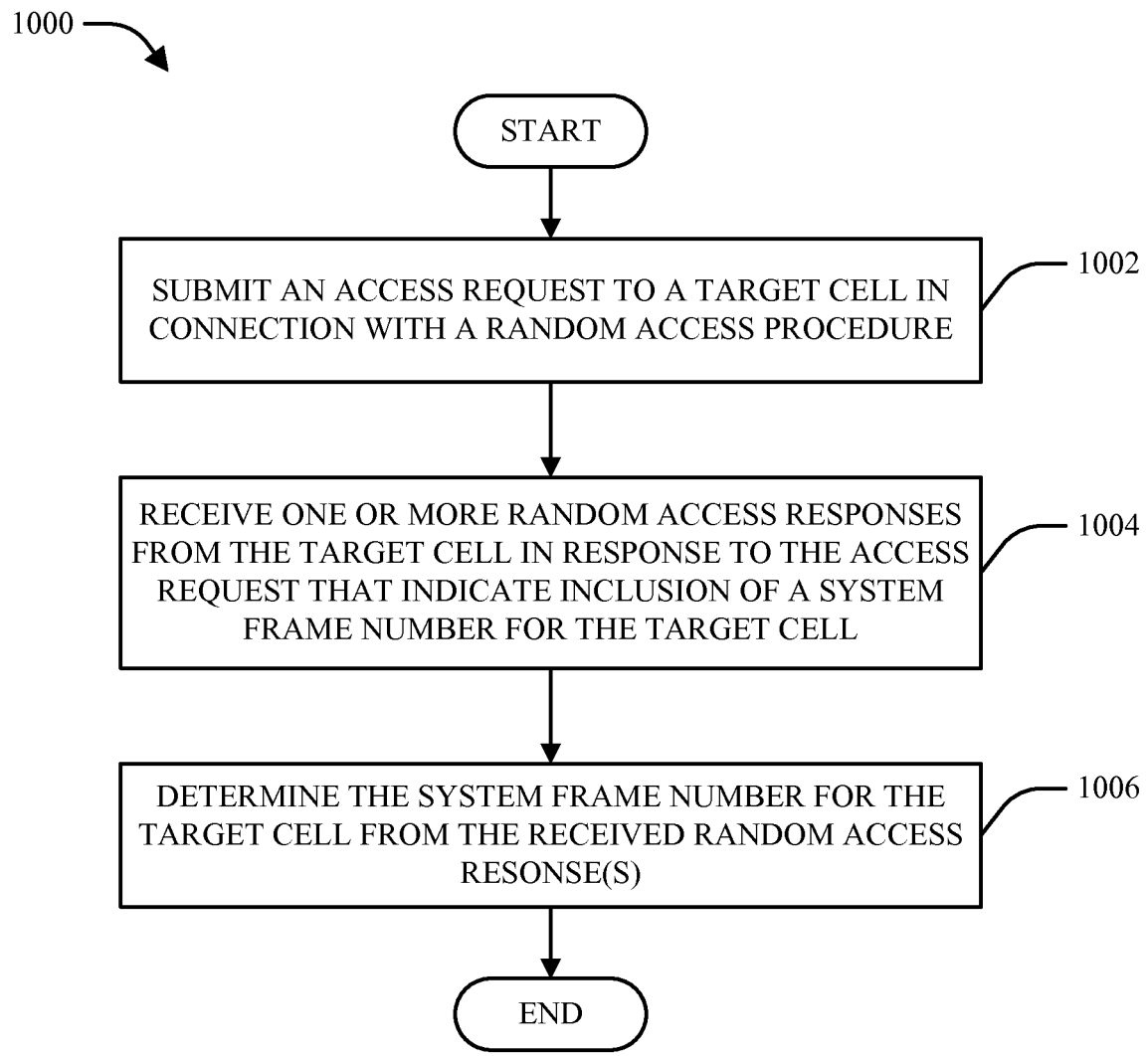
FIG. 10 is a flow diagram of a methodology for obtaining system frame number information during a random access procedure.

Referring next to FIG. 10, a methodology 1000 for obtaining SFN information during a random access procedure is illustrated. It is to be appreciated that methodology 1000 can be performed by, for example, a mobile terminal (e.g., terminal 130) and/or any other appropriate network device. Methodology 1000 begins at block 1002, wherein an access request (e.g., Message 1 232) is submitted to a target cell (e.g., target base station 120) in connection with a random access procedure. Next, at block 1004, one or more Random Access Responses are received from the target cell in response to the access request submitted at block 1002 (e.g., via a Message 2 234) that indicate the inclusion of a SFN for the target cell. In one example, a SFN can be included in one or more messages received at block 1004 using an example message structure as illustrated by diagram 602 and/or diagram 604, and/or in any other suitable manner. Methodology 1000 can then conclude at block 1006, wherein the SFN of the target cell is determined from the Random Access Response(s) received at block 1004.

Figure 11:
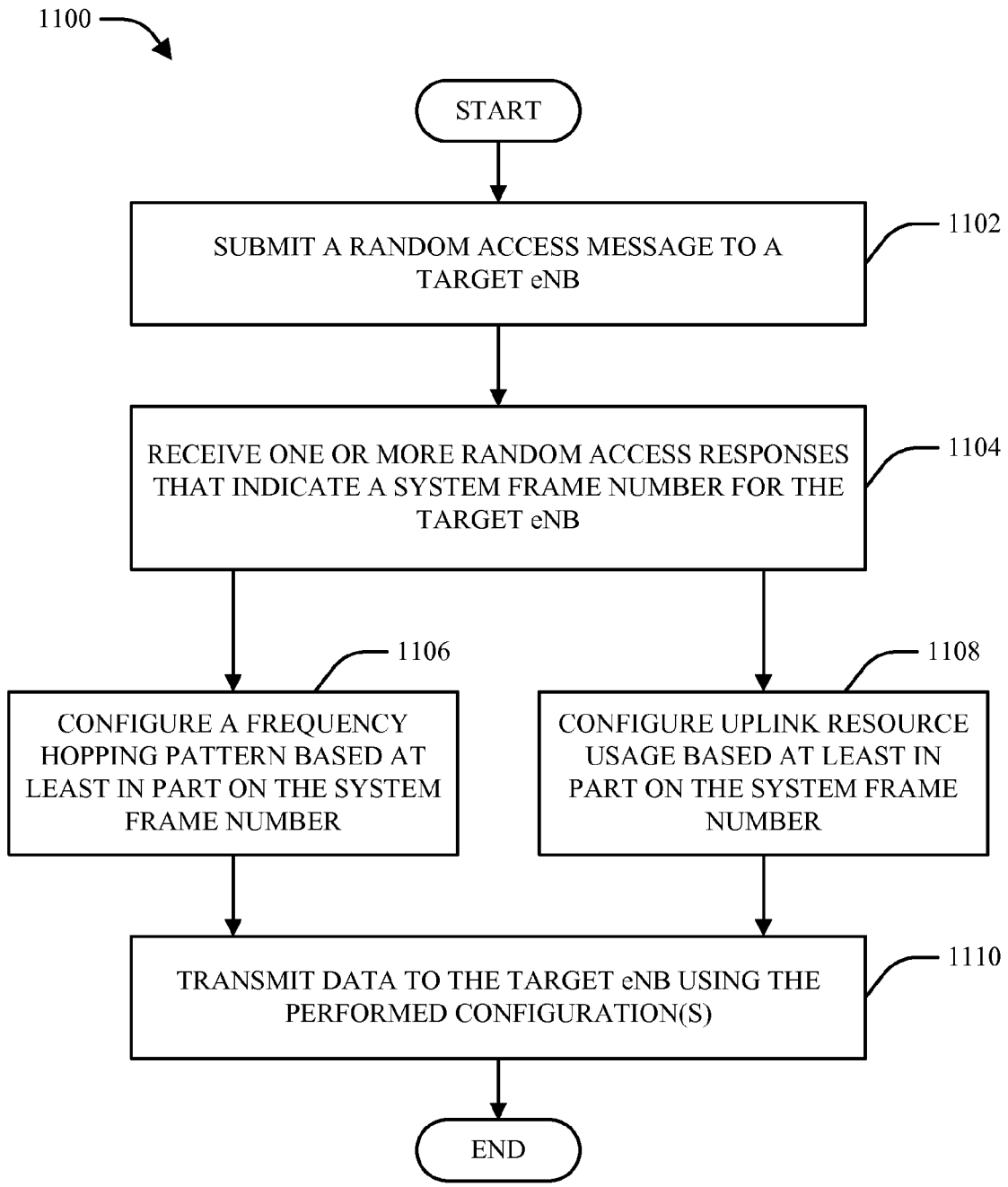
FIG. 11 is a flow diagram of a methodology for identifying and processing system frame number information.

Turning to FIG. 11, illustrated is a methodology 1100 for identifying and processing system frame number information. Methodology 1100 can be performed by, for example, a UE and/or any other appropriate network device. Methodology 1100 begins at block 1102, wherein a random access message is submitted to a target eNB during a handover. Next, at block 1104, one or more random access responses are received that indicate a SFN for the target eNB.

Upon completing the acts described at block 1104, methodology 1100 can proceed to block 1106, wherein a frequency hopping pattern is configured (e.g., by a hopping initialization module 132) based at least in part on the SFN obtained at block 1104, and/or to block 1108, wherein uplink resource usage is configured (e.g., by a resource configuration module 134) based at least in part on the SFN obtained at block 1104. Upon completion of the acts described at block 1106 and/or block 1108, methodology 1100 can conclude at block 1110, wherein data is transmitted to the target eNB using the configuration(s) performed at block 1106 and/or block 1108.

Figure 12:
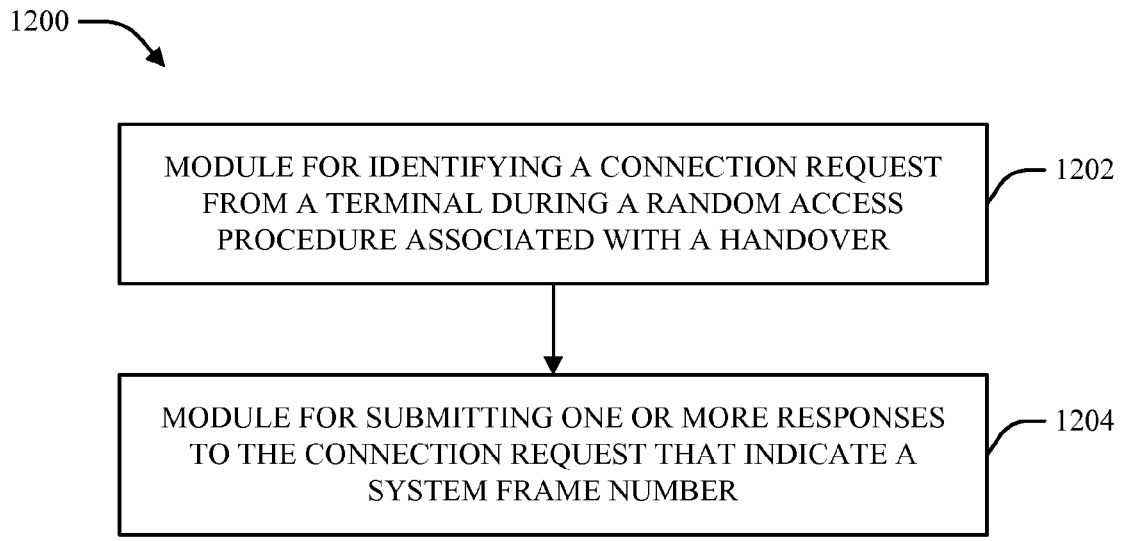
FIGS. 12-13 are block diagrams of respective apparatus that facilitate handover in a wireless communication system.

Moving to FIG. 12, an apparatus 1200 that facilitates handover in a wireless communication system is illustrated. It is to be appreciated that apparatus 1200 is represented as including functional blocks, which can be functional blocks that represent functions implemented by a processor, software, or combination thereof (e.g., firmware). Apparatus 1200 can be implemented by a eNB (e.g., base station 110 and/or base station 120) and can include a module 1202 for identifying a connection request from a terminal during a random access procedure associated with a handover and a module 1204 for submitting one or more responses to the connection request that indicate a SFN.

Figure 13:
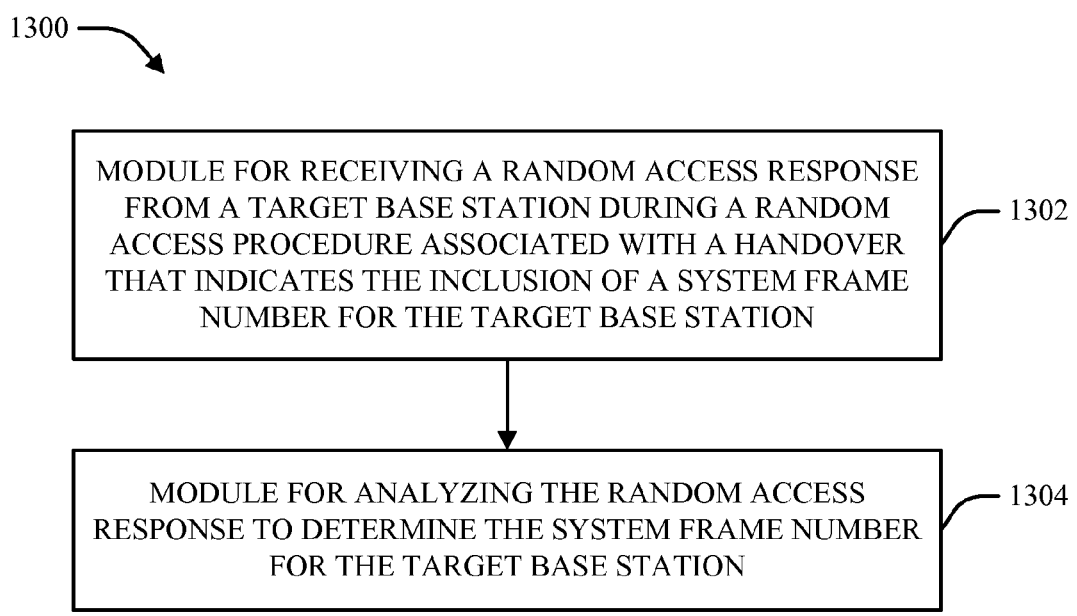

FIG. 13 illustrates another apparatus 1300 that facilitates handover in a wireless communication system. It is to be appreciated that apparatus 1300 is represented as including functional blocks, which can be functional blocks that represent functions implemented by a processor, software, or combination thereof (e.g., firmware). Apparatus 1300 can be implemented by a UE (e.g., terminal 130) and can include a module 1302 for receiving a Random Access Response from a target base station during a random access procedure associated with a handover that indicates the inclusion of a SFN for the target base station and a module 1304 for analyzing the received Random Access Response to determine the SFN for the target base station.

Figure 14:
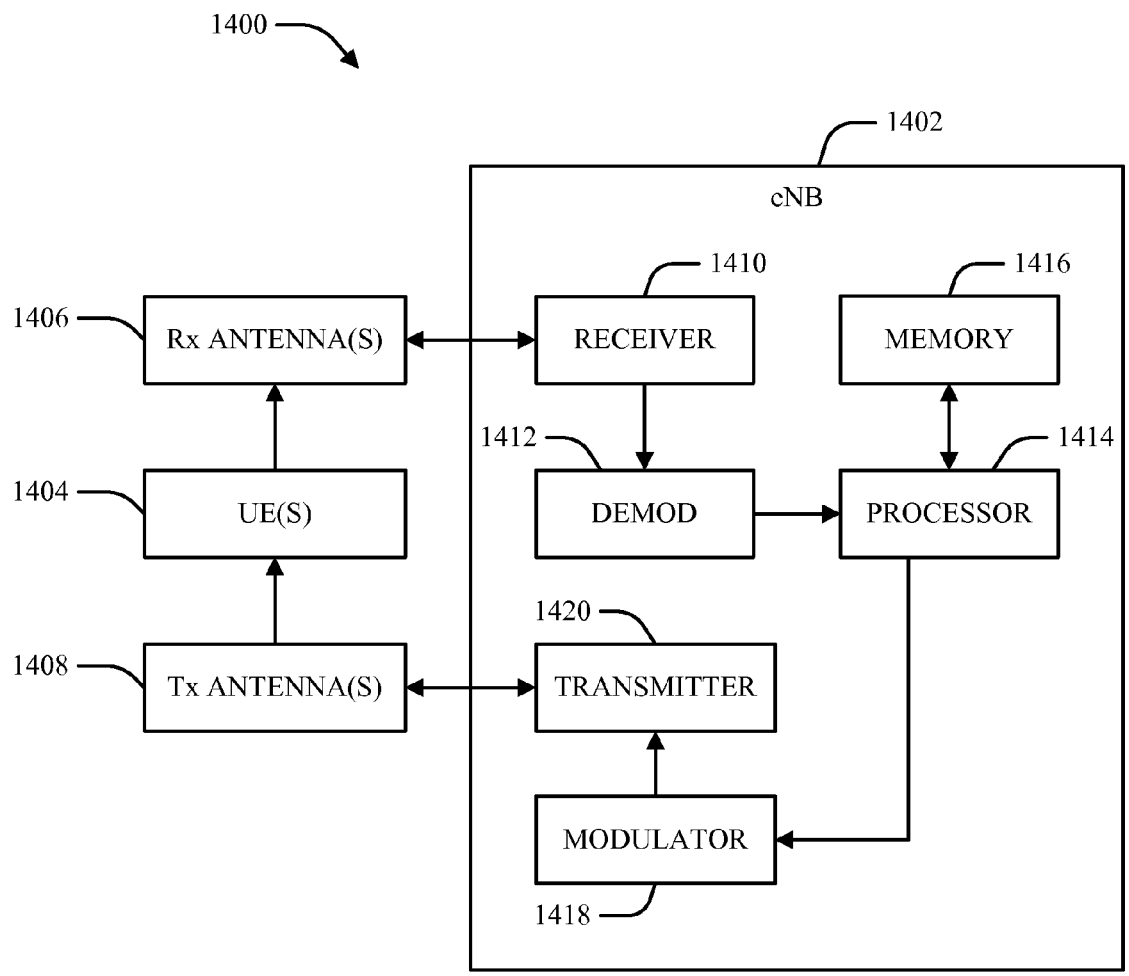
FIGS. 14-15 are block diagrams of respective wireless communication devices that can be utilized to implement various aspects of the functionality described herein.

FIG. 14 is a block diagram of a system 1400 that can be utilized to implement various aspects of the functionality described herein. In one example, system 1400 includes a base station or eNB 1402. As illustrated, eNB 1402 can receive signal(s) from one or more UEs 1404 via one or more receive (Rx) antennas 1406 and transmit to the one or more UEs 1404 via one or more transmit (Tx) antennas 1408. Additionally, eNB 1402 can comprise a receiver 1410 that receives information from receive antenna(s) 1406. In one example, the receiver 1410 can be operatively associated with a demodulator (Demod) 1412 that demodulates received information. Demodulated symbols can then be analyzed by a processor 1414. Processor 1414 can be coupled to memory 1416, which can store information related to code clusters, access terminal assignments, lookup tables related thereto, unique scrambling sequences, and/or other suitable types of information. In one example, eNB 1402 can employ processor 1414 to perform methodologies 700, 800, 900, and/or other similar and appropriate methodologies. eNB 1402 can also include a modulator 1418 that can multiplex a signal for transmission by a transmitter 1420 through transmit antenna(s) 1408.

Figure 15:
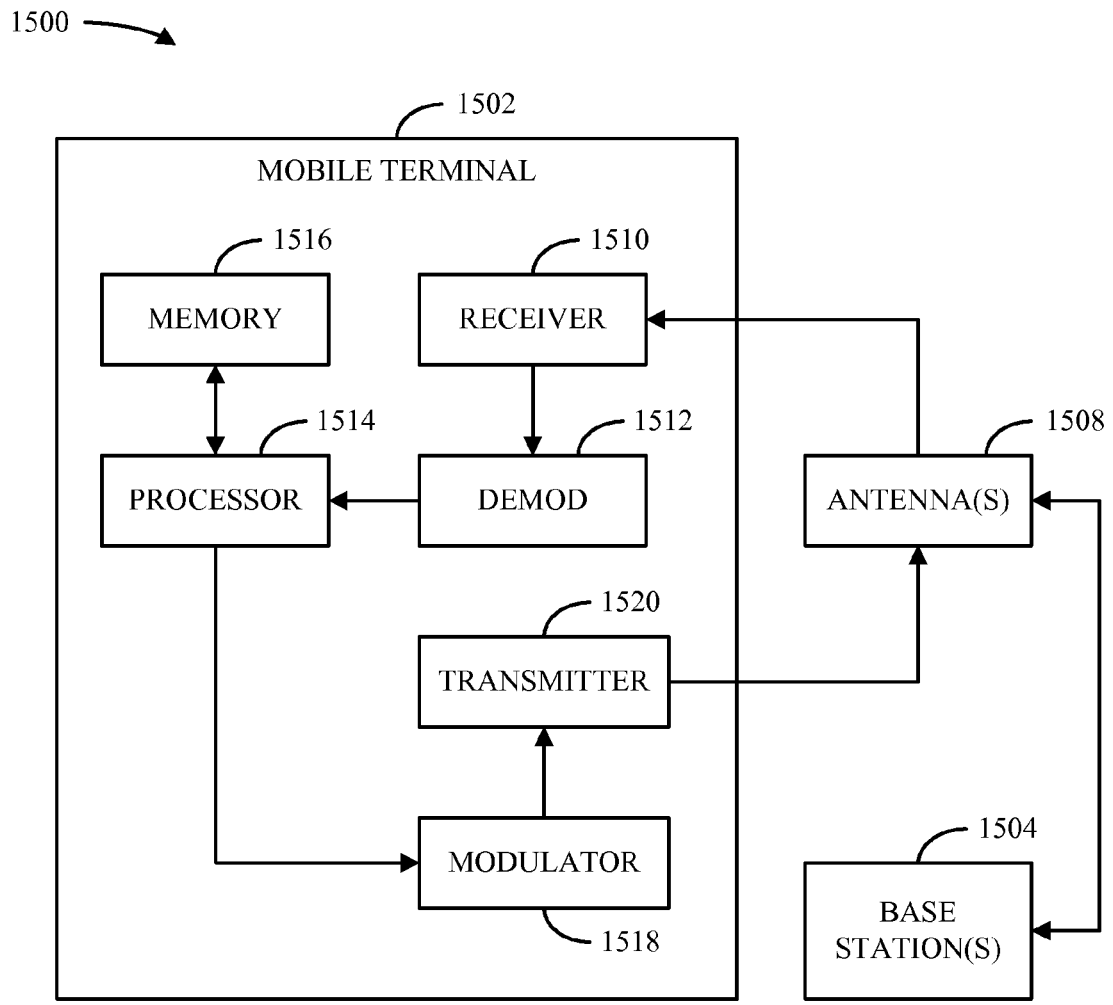

FIG. 15 is a block diagram of another system 1500 that can be utilized to implement various aspects of the functionality described herein. In one example, system 1500 includes a mobile terminal 1502. As illustrated, mobile terminal 1502 can receive signal(s) from one or more base stations 1504 and transmit to the one or more base stations 1504 via one or more antennas 1508. Additionally, mobile terminal 1502 can comprise a receiver 1510 that receives information from antenna(s) 1508. In one example, receiver 1510 can be operatively associated with a demodulator (Demod) 1512 that demodulates received information. Demodulated symbols can then be analyzed by a processor 1514. Processor 1514 can be coupled to memory 1516, which can store data and/or program codes related to mobile terminal 1502. Additionally, mobile terminal 1502 can employ processor 1514 to perform methodologies 1000, 1100, and/or other similar and appropriate methodologies. Mobile terminal 1502 can also include a modulator 1518 that can multiplex a signal for transmission by a transmitter 1520 through antenna(s) 1508.

Figure 16:
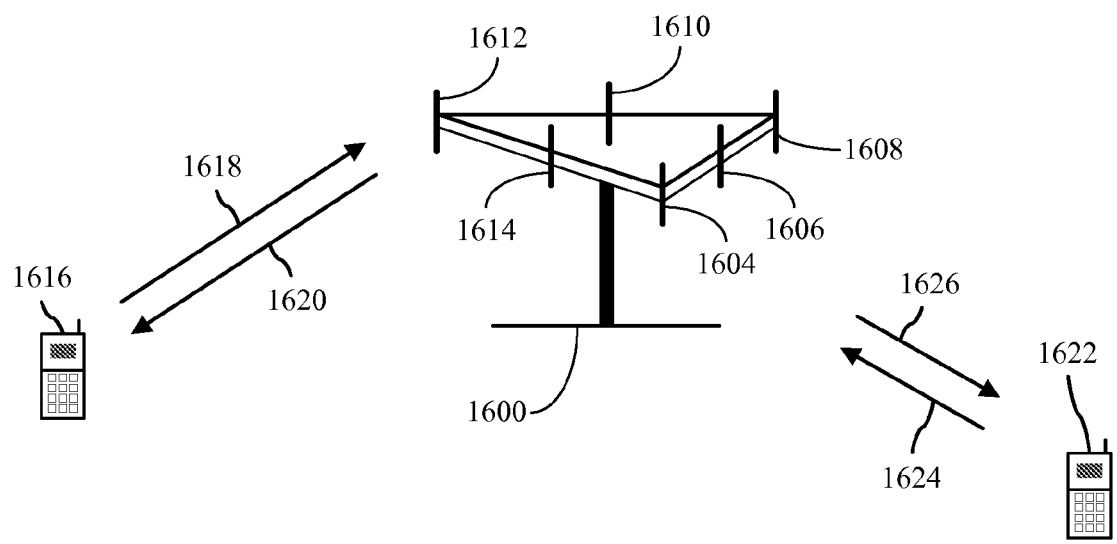
FIG. 16 illustrates a wireless multiple-access communication system in accordance with various aspects set forth herein.

Referring now to FIG. 16, an illustration of a wireless multiple-access communication system is provided in accordance with various aspects. In one example, an access point 1600 (AP) includes multiple antenna groups. As illustrated in FIG. 16, one antenna group can include antennas 1604 and 1606, another can include antennas 1608 and 1610, and another can include antennas 1612 and 1614. While only two antennas are shown in FIG. 16 for each antenna group, it should be appreciated that more or fewer antennas may be utilized for each antenna group. In another example, an access terminal 1616 can be in communication with antennas 1612 and 1614, where antennas 1612 and 1614 transmit information to access terminal 1616 over forward link 1620 and receive information from access terminal 1616 over reverse link 1618. Additionally and/or alternatively, access terminal 1622 can be in communication with antennas 1606 and 1608, where antennas 1606 and 1608 transmit information to access terminal 1622 over forward link 1626 and receive information from access terminal 1622 over reverse link 1624. In a frequency division duplex system, communication links 1618, 1620, 1624 and 1626 can use different frequency for communication. For example, forward link 1620 may use a different frequency then that used by reverse link 1618.

Each group of antennas and/or the area in which they are designed to communicate can be referred to as a sector of the access point. In accordance with one aspect, antenna groups can be designed to communicate to access terminals in a sector of areas covered by access point 1600. In communication over forward links 1620 and 1626, the transmitting antennas of access point 1600 can utilize beamforming in order to improve the signal-to-noise ratio of forward links for the different access terminals 1616 and 1622. Also, an access point using beamforming to transmit to access terminals scattered randomly through its coverage causes less interference to access terminals in neighboring cells than an access point transmitting through a single antenna to all its access terminals.

An access point, e.g., access point 1600, can be a fixed station used for communicating with terminals and can also be referred to as a base station, an eNB, an access network, and/or other suitable terminology. In addition, an access terminal, e.g., an access terminal 1616 or 1622, can also be referred to as a mobile terminal, user equipment, a wireless communication device, a terminal, a wireless terminal, and/or other appropriate terminology.

Figure 17:
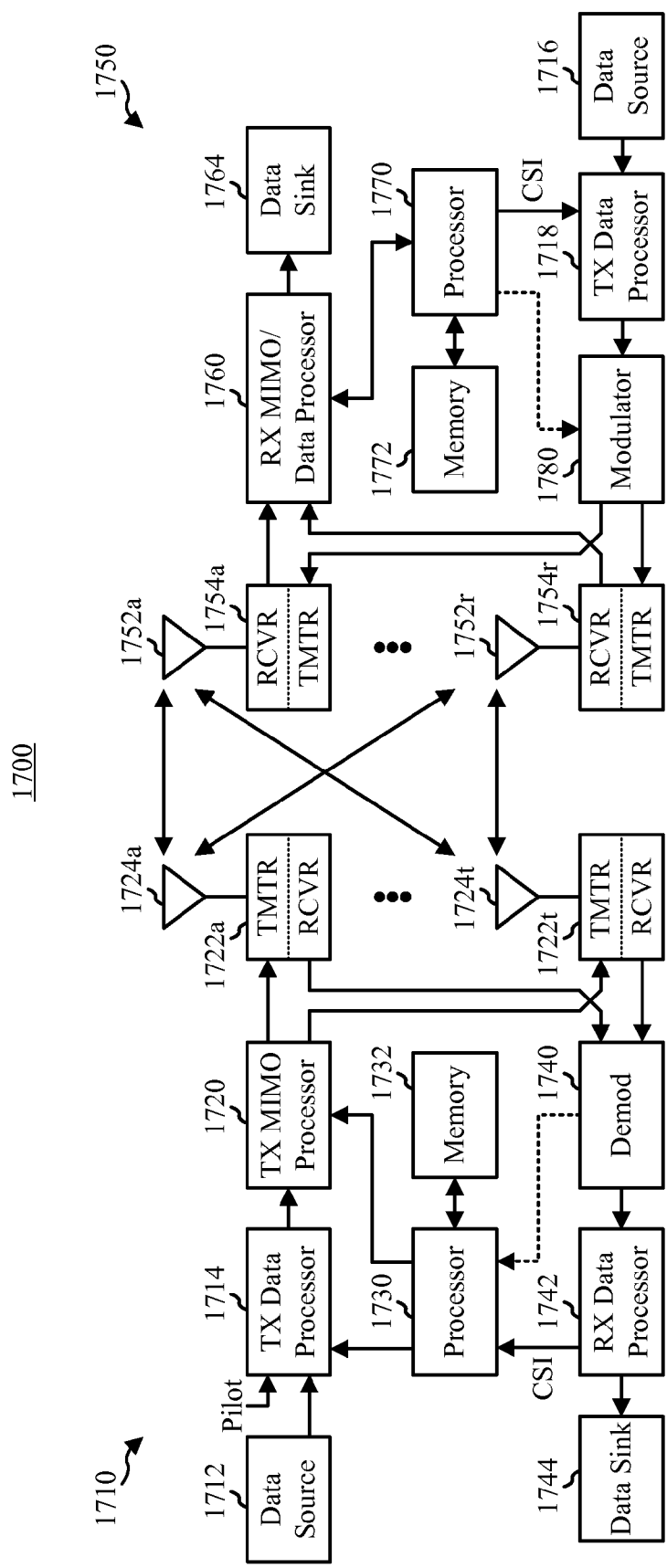
FIG. 17 is a block diagram illustrating an example wireless communication system in which various aspects described herein can function.

Referring now to FIG. 17, a block diagram illustrating an example wireless communication system 1700 in which various aspects described herein can function is provided. In one example, system 1700 is a multiple-input multiple-output (MIMO) system that includes a transmitter system 1710 and a receiver system 1750. It should be appreciated, however, that transmitter system 1710 and/or receiver system 1750 could also be applied to a multi-input single-output system wherein, for example, multiple transmit antennas (e.g., on a base station), can transmit one or more symbol streams to a single antenna device (e.g., a mobile station). Additionally, it should be appreciated that aspects of transmitter system 1710 and/or receiver system 1750 described herein could be utilized in connection with a single output to single input antenna system.

In accordance with one aspect, traffic data for a number of data streams are provided at transmitter system 1710 from a data source 1712 to a transmit (TX) data processor 1714. In one example, each data stream can then be transmitted via a respective transmit antenna 1724. Additionally, TX data processor 1714 can format, encode, and interleave traffic data for each data stream based on a particular coding scheme selected for each respective data stream in order to provide coded data. In one example, the coded data for each data stream can then be multiplexed with pilot data using OFDM techniques. The pilot data can be, for example, a known data pattern that is processed in a known manner. Further, the pilot data can be used at receiver system 1750 to estimate channel response. Back at transmitter system 1710, the multiplexed pilot and coded data for each data stream can be modulated (i.e., symbol mapped) based on a particular modulation scheme (e.g., BPSK, QSPK, M-PSK, or M-QAM) selected for each respective data stream in order to provide modulation symbols. In one example, data rate, coding, and modulation for each data stream can be determined by instructions performed on and/or provided by processor 1730.

Next, modulation symbols for all data streams can be provided to a TX processor 1720, which can further process the modulation symbols (e.g., for OFDM). TX MIMO processor 1720 can then provides $N_T$ modulation symbol streams to $N_T$ transceivers 1722a through 1722t. In one example, each transceiver 1722 can receive and process a respective symbol stream to provide one or more analog signals. Each transceiver 1722 can then further condition (e.g., amplify, filter, and upconvert) the analog signals to provide a modulated signal suitable for transmission over a MIMO channel. Accordingly, $N_T$ modulated signals from transceivers 1722a through 1722t can then be transmitted from $N_T$ antennas 1724a through 1724t, respectively.

In accordance with another aspect, the transmitted modulated signals can be received at receiver system 1750 by $N_R$ antennas 1752a through 1752r. The received signal from each antenna 1752 can then be provided to respective transceivers 1754. In one example, each transceiver 1754 can condition (e.g., filter, amplify, and downconvert) a respective received signal, digitize the conditioned signal to provide samples, and then processes the samples to provide a corresponding "received" symbol stream. An RX MIMO/data processor 1760 can then receive and process the $N_R$ received symbol streams from $N_R$ transceivers 1754 based on a particular receiver processing technique to provide $N_T$ "detected" symbol streams. In one example, each detected symbol stream can include symbols that are estimates of the modulation symbols transmitted for the corresponding data stream. RX processor 1760 can then process each symbol stream at least in part by demodulating, deinterleaving, and decoding each detected symbol stream to recover traffic data for a corresponding data stream. Thus, the processing by RX processor 1760 can be complementary to that performed by TX MIMO processor 1720 and TX data processor 1716 at transmitter system 1710. RX processor 1760 can additionally provide processed symbol streams to a data sink 1764.

In accordance with one aspect, the channel response estimate generated by RX processor 1760 can be used to perform space/time processing at the receiver, adjust power levels, change modulation rates or schemes, and/or other appropriate actions. Additionally, RX processor 1760 can further estimate channel characteristics such as, for example, signal-to-noise-and-interference ratios (SNRs) of the detected symbol streams. RX processor 1760 can then provide estimated channel characteristics to a processor 1770. In one example, RX processor 1760 and/or processor 1770 can further derive an estimate of the "operating" SNR for the system. Processor 1770 can then provide channel state information (CSI), which can comprise information regarding the communication link and/or the received data stream. This information can include, for example, the operating SNR. The CSI can then be processed by a TX data processor 1718, modulated by a modulator 1780, conditioned by transceivers 1754a through 1754r, and transmitted back to transmitter system 1710. In addition, a data source 1716 at receiver system 1750 can provide additional data to be processed by TX data processor 1718.

Back at transmitter system 1710, the modulated signals from receiver system 1750 can then be received by antennas 1724, conditioned by transceivers 1722, demodulated by a demodulator 1740, and processed by a RX data processor 1742 to recover the CSI reported by receiver system 1750. In one example, the reported CSI can then be provided to processor 1730 and used to determine data rates as well as coding and modulation schemes to be used for one or more data streams. The determined coding and modulation schemes can then be provided to transceivers 1722 for quantization and/or use in later transmissions to receiver system 1750. Additionally and/or alternatively, the reported CSI can be used by processor 1730 to generate various controls for TX data processor 1714 and TX MIMO processor 1720. In another example, CSI and/or other information processed by RX data processor 1742 can be provided to a data sink 1744.

In one example, processor 1730 at transmitter system 1710 and processor 1770 at receiver system 1750 direct operation at their respective systems. Additionally, memory 1732 at transmitter system 1710 and memory 1772 at receiver system 1750 can provide storage for program codes and data used by processors 1730 and 1770, respectively. Further, at receiver system 1750, various processing techniques can be used to process the $N_R$ received signals to detect the $N_T$ transmitted symbol streams. These receiver processing techniques can include spatial and space-time receiver processing techniques, which can also be referred to as equalization techniques, and/or "successive nulling/equalization and interference cancellation" receiver processing techniques, which can also be referred to as "successive interference cancellation" or "successive cancellation" receiver processing techniques.

It is to be understood that the aspects described herein can be implemented by hardware, software, firmware, middleware, microcode, or any combination thereof. When the systems and/or methods are implemented in software, firmware, middleware or microcode, program code or code segments, they can be stored in a machine-readable medium, such as a storage component. A code segment can represent a procedure, a function, a subprogram, a program, a routine, a subroutine, a module, a software package, a class, or any combination of instructions, data structures, or program statements. A code segment can be coupled to another code segment or a hardware circuit by passing and/or receiving information, data, arguments, parameters, or memory contents. Information, arguments, parameters, data, etc. can be passed, forwarded, or transmitted using any suitable means including memory sharing, message passing, token passing, network transmission, etc.

For a software implementation, the techniques described herein can be implemented with modules (e.g., procedures, functions, and so on) that perform the functions described herein. The software codes can be stored in memory units and executed by processors. The memory unit can be implemented within the processor or external to the processor, in which case it can be communicatively coupled to the processor via various means as is known in the art.

What has been described above includes examples of one or more aspects. It is, of course, not possible to describe every conceivable combination of components or methodologies for purposes of describing the aforementioned aspects, but one of ordinary skill in the art can recognize that many further combinations and permutations of various aspects are possible. Accordingly, the described aspects are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim. Furthermore, the term "or" as used in either the detailed description or the claims is meant to be a "non-exclusive or."

What is claimed is:

1. A method for conducting a random access procedure in a wireless communication system, comprising:
   identifying an access request during a random access procedure associated with a handover between at least one terminal and a target base station;
   configuring one or more Random Access Responses (RARs) to include a system frame number (SFN) of the target base station by inserting the SFN into at least one of a header, sub-header or payload associated with the one or more RARs; and
   transmitting, by the target base station, the one or more configured RARs to the at least one terminal during an access phase associated with the random access procedure.

2. The method of claim 1, wherein the configuring comprises inserting the SFN into a predefined field of the sub-header associated with the one or more RARs.

3. The method of claim 1, wherein the configuring further comprises configuring the SFN to occupy one or more octets appended to an end of a RAR.

4. The method of claim 1, wherein the configuring further comprises setting one or more reserved bits in a RAR to indicate inclusion of the SFN in the RAR.

5. The method of claim 1, wherein the configuring further comprises setting one or more bits in the header associated with a RAR to indicate inclusion of the SFN in the RAR.

6. The method of claim 1, wherein the random access procedure comprises an initial access by the at least one terminal.

7. The method of claim 2, wherein the configuring further comprises configuring one or more bits in the sub-header associated with the one or more RARs to include an indication that the SFN is included in the sub-header.

8. The method of claim 2, wherein the sub-header associated with the one or more RARs comprises an Extension (E) bit, a Type (T) bit, one or more Reserved (R) bits, and a Backoff Indicator (BI) field comprising a plurality of bits.

9. The method of claim 8, wherein the inserting the SFN comprises inserting the SFN into the BI field of the sub-header and one or more bits in an octet following the BI field.

10. The method of claim 8, wherein the configuring further comprises utilizing one or more of the Reserved bits to indicate inclusion of the SFN in the sub-header.

11. A wireless communications apparatus, comprising:
    a memory that stores data relating to a user equipment (UE) with which a connection is to be established during a random access procedure associated with a handover between the UE and the wireless communication apparatus, the memory storing a system frame number (SFN) associated with the wireless communications apparatus; and
    a processor configured to incorporate the SFN into at least one Random Access Response (RAR) by inserting the SFN into at least one of a header, sub-header or payload associated with the at least one RAR, and to transmit the at least one RAR from the wireless communication apparatus to the UE during an access phase of the random access procedure.

12. The wireless communications apparatus of claim 11, wherein the processor is further configured to incorporate the at least one RAR into a Medium Access Control (MAC) Protocol Data Unit (PDU).

13. The wireless communications apparatus of claim 11, wherein the random access procedure comprises an initial access procedure conducted between the wireless communications apparatus and the UE.

14. The wireless communications apparatus of claim 12, wherein the processor is further configured to insert the SFN into a sub-header of the MAC PDU.

15. The wireless communications apparatus of claim 12, wherein the processor is further configured to append the SFN to one or more octets located at an end of the RAR.

16. The wireless communications apparatus of claim 14, wherein the processor is further configured to configure one or more bits in the sub-header of the MAC PDU to include an indicate that the SFN is included in the sub-header.

17. The wireless communications apparatus of claim 14, wherein the sub-header of the MAC PDU comprises a 1-bit Extension (E) field, a 1-bit Type (T) field, a 2-bit Reserved (R) field, and a 4-bit Backoff Indicator (BI) field.

18. The wireless communications apparatus of claim 17, wherein the processor is further configured to insert the SFN into the BI field of the sub-header and an octet following the BI field.

19. The wireless communications apparatus of claim 17, wherein the processor is further configured to set one or more bits in the Reserved field to indicate inclusion of the SFN in the sub-header.

20. The wireless communications apparatus of claim 15, wherein the processor is further configured to indicate incorporation of the SFN in the RAR by setting at least one of a reserved bit in the RAR or a bit in a header of the MAC PDU corresponding to the RAR.

21. An apparatus that facilitates a random access procedure in a wireless communication system, the apparatus comprising:
    means for receiving a connection request from a terminal during an access phase of a random access procedure associated with a handover between the terminal and the apparatus;
    means for submitting one or more responses from the apparatus to the terminal during the access phase of the random access procedure that indicate a system frame number (SFN) associated with the apparatus; and means for inserting the SFN associated with the apparatus into at least one of a header, sub-header, or payload associated with one of the one or more responses.

22. The apparatus of claim 21, further comprising means for setting one or more bits in the sub-header of the one or more responses to indicate that the SFN has been inserted into the sub-header.

23. The apparatus of claim 21, further comprising means for setting one or more bits in the payload of the one or more responses or in the header of the one or more responses to indicate inclusion of the SFN in the one or more responses.

24. A computer program product, comprising: a non-transitory computer-readable medium, comprising:

code for identifying a user equipment (UE) to be attached during a random access procedure associated with a handover between the UE and a target evolved Node B (eNB);

code for determining a system frame number (SFN) of the target eNB;

code for configuring one or more Random Access Responses (RARs) to include the SFN by inserting the SFN into a header, sub-header or payload associated with the one or more RARs; and code for transmitting the one or more RARs from the target eNB to the UE during an access phase associated with the random access procedure.

25. The computer program product of claim 24, wherein the computer-readable medium further comprises code for setting one or more bits in the sub-header associated with the one or more RARs to indicate inclusion of the SFN in the sub-header.

26. The computer program product of claim 24, wherein the computer-readable medium further comprises code for setting one or more bits in the payload of the one or more RARs or in the header associated with the one or more RARs to indicate inclusion of the SFN in the payload of the one or more RARs.

27. A method used in a wireless communication system, the method comprising:

constructing an 8-bit medium access control (MAC) sub-header, the MAC sub-header comprising a 1-bit Extension (E) field, a 1-bit Type (T) field, a 1-bit system frame number (SFN) indicator (S) field, a 1-bit Reserved (R) field, and a 4-bit Backoff Indicator (BI) field, a system frame number (SFN) identified by the 1-bit SFN indicator S field being associated with a target evolved Node B (eNB);

setting the T field to a value that indicates presence of the BI field in the MAC sub-header;

setting the S field to a value that indicates presence of a SFN in the BI field in place of BI information; placing a first portion of the SFN in the BI field of the MAC sub-header;

placing a second portion of the SFN in an octet immediately following the BI field of the MAC sub-header; and transmitting, by the target eNB, the MAC sub-header within at least one MAC Protocol Data Unit (PDU) to a terminal during an access phase of a random access procedure associated with a handover between a user equipment (UE) and the target eNB.

28. A method for accessing a target cell in connection with a random access procedure, comprising:

submitting an access request to a target cell during an access phase of a random access procedure associated with a handover between a user equipment (UE) and a target evolved Node B (eNB) of the target cell;

receiving one or more responses to the access request from the target cell during the access phase of the random access procedure that indicate inclusion of a system frame number (SFN) for the eNB of the target cell; and determining the SFN for the eNB of the target cell by analyzing at least one of a header, sub-header, or payload associated with the one or more received responses.

29. The method of claim 28, wherein:

the receiving comprises identifying an indication in the sub-header associated with the one or more responses that the SFN is included in the sub-header; and the determining comprises reading the SFN from a predefined field in the sub-header associated with the one or more responses.

30. The method of claim 28, wherein the receiving comprises identifying an indication in the one or more responses or the header associated with the one or more responses that the SFN is included in the one or more responses.

31. The method of claim 28, further comprising configuring an uplink frequency hopping pattern based at least in part on the SFN.

32. The method of claim 28, further comprising configuring uplink resource usage based at least in part on the SFN.

33. The method of claim 28, wherein the random access procedure comprises an initial access of the target cell.

34. The method of claim 29, wherein the sub-header associated with the one or more responses comprises an Extension (E) bit, a Type (T) bit, one or more Reserved (R) bits, and a Backoff Indicator (BI) field comprising a plurality of bits.

35. The method of claim 34, wherein:

the identifying an indication comprises determining whether one or more of the Reserved bits indicate inclusion of the SFN in the sub-header; and the reading the SFN comprises reading the SFN from the BI field of the sub-header and one or more bits in an octet following the BI field.

36. A wireless communications apparatus, comprising:

a memory that stores data relating to one or more Random Access Responses (RARs) received from a target Evolved Node B (eNB) during an access phase of a random access procedure associated with a handover between the wireless communication apparatus and the target eNB; and a processor configured to identify at least one RAR received from the target eNB that contains a system frame number (SFN) associated with the target eNB and to determine the SFN associated with the target eNB from at least one of a header, sub-header or payload associated with the at least one identified RAR.

37. An apparatus that facilitates a random access procedure in a wireless communication system, the apparatus comprising:

means for receiving a Random Access Response (RAR) from a target base station during a random access procedure associated with a handover between the apparatus and the target base station, in which the RAR includes a system frame number (SFN) for the target base station;

means for analyzing the received RAR to determine the SFN for the target base station; and means for identifying the SFN for the target base station from at least one of a header, sub-header or payload associated with the received RAR.

38. A computer program product, comprising: a non-transitory computer-readable medium, comprising:

code for receiving one or more Random Access Responses (RARs) from a target cell of a random access procedure during an access phase of the random access procedure, the random access procedure being associated with a handover between a user equipment (UE) and an evolved Node B (eNB) of the target cell;

code for identifying a RAR from the target cell that indicates a system frame number (SFN) of the target cell; and code for determining the SFN of the eNB of the target cell from at least one of a header, sub-header, or payload associated with the identified RAR.

39. An integrated circuit that executes computer-executable instructions for identifying system frame number (SFN) information associated with a target cell during a random access procedure, the instructions comprising:

transmitting an access request to a target cell during a random access procedure associated with a handover between a user equipment (UE) and a target evolved node B (eNB) of the target cell;

receiving one or more responses to the access request from the target cell during the random access procedure;

identifying an indication in at least one of the responses that a SFN for the target cell is included in an indicated response; and obtaining the SFN of the eNB for the target cell from at least one of a header, sub-header or payload associated with the indicated response.

* * * * *